(12) United States Patent
Tanaka

(10) Patent No.: US 7,912,248 B2
(45) Date of Patent: Mar. 22, 2011

(54) HIERARCHICAL FEATURE TRACKING USING OPTICAL FLOW

(75) Inventor: Koichi Tanaka, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/457,963

(22) Filed: Jun. 26, 2009

(65) Prior Publication Data

US 2009/0324013 A1   Dec. 31, 2009

(30) Foreign Application Priority Data

Jun. 27, 2008   (JP) .................................. 2008-168921

(51) Int. Cl.
   *G06K 9/00*   (2006.01)
(52) U.S. Cl. ........ 382/103; 382/100; 382/181; 382/190; 382/240; 382/276
(58) Field of Classification Search .................. 382/100, 382/181, 190, 240, 276, 325, 103
   See application file for complete search history.

(56) References Cited

U.S. PATENT DOCUMENTS

| | | | | |
|---|---|---|---|---|
| 5,627,905 | A | * | 5/1997 | Sebok et al. .................. 382/107 |
| 5,748,761 | A | * | 5/1998 | Chang et al. .................. 382/107 |
| 6,456,731 | B1 | | 9/2002 | Chiba et al. |
| 6,788,802 | B2 | | 9/2004 | Chiba et al. |
| 7,522,749 | B2 | * | 4/2009 | Zitnick et al. ................. 382/107 |
| 2005/0226462 | A1 | * | 10/2005 | Wittebrood et al. .......... 382/103 |
| 2006/0023786 | A1 | * | 2/2006 | Li et al. ..................... 375/240.16 |

FOREIGN PATENT DOCUMENTS

| | | |
|---|---|---|
| JP | 3435084 | 5/2003 |
| JP | 2007-49545 | 2/2007 |

* cited by examiner

*Primary Examiner* — Aaron W Carter
*Assistant Examiner* — Stephen R Koziol
(74) *Attorney, Agent, or Firm* — McGinn IP Law Group, PLLC

(57) ABSTRACT

An image processing apparatus enables efficient feature point tracking. A displacement calculating unit reads a hierarchical tier image with the smallest image size from each of a reference pyramid and a tracking pyramid in an image memory, and performs repetitive detection of a tracking point using a hierarchical gradient method. The displacement calculating unit repeatedly calculates a displacement amount between the feature points, and outputs a value of a repetition count of tracking point detection until convergence of the displacement amount and the value of the displacement amount at a time of convergence. A repetition criterion setting unit changes the criterion for determination of displacement amount convergence based on the repetition count and displacement amount. The displacement calculating unit reads upper hierarchical tier images and detects a tracking point according to the changed criterion. The repetitive tracking point detection and convergence determination criterion setting change are repeated.

36 Claims, 16 Drawing Sheets

HIERARCHICAL FEATURE TRACKING USING OPTICAL FLOW

BACKGROUND OF THE INVENTION

1. Field of the Invention

The present invention relates to an image processing apparatus and an image processing method, and specifically relates to an image processing apparatus and an image processing method, which detect movements of a subject appearing in a plurality of images.

2. Description of the Related Art

As a method for detecting movements of a subject appearing a plurality of images, the technique of estimating where a feature point (pixel) in an image that serves as a reference (hereinafter, referred to as "reference image") have moved in another image (hereinafter, referred to as "tracking image"), that is, the technique of tracking (estimating) the locus (optical flow) of the feature point, has been proposed.

Gradient methods, which are typified by the Lucas-Kanade method, are representatives of the technique of tracking a feature point through a plurality of images. In a gradient method, a displacement (movement amount) of a feature point is figured out from the gradient (first-order derivative) of an image signal in each of the temporal direction and the spatial direction. For example, as described in Japanese Patent No. 3435084, a displacement of a feature point is calculated by solving optical flow, temporal and spatial derivative constraint equations under predetermined conditions.

In general, gradient methods have a problem in that the accuracy of calculation of displacement of a subject is lowered when the subject makes a large movement. As methods for solving such problem, hierarchical gradient methods have been proposed (Japanese Patent No. 3435084 and Japanese Patent Application Laid-Open No. 2007-49545). In a hierarchical gradient method, inverted pyramid hierarchical tier image groups are created by means of stepwise reduction of a reference image and a tracking image to form inverted pyramid hierarchies, the coordinates of a feature point are detected in the hierarchical tier images in the inverted pyramid hierarchical tier image groups in increasing order of image size (pixel count) (i.e, in increasing order of feature point displacement amount (pixel count) upon movement), and when detecting the feature point in a hierarchical tier image with a larger image size, the detection result (tracking result) of the feature point in a hierarchical tier image with a smaller image size is reflected.

In gradient methods, a predetermined feature point in a reference image can be tracked more correctly by repeatedly detecting a point corresponding to the feature point in a tracking image. More specifically, the position of a feature point (tracking point) in a tracking image is repeatedly figured out. Then, when the difference value (displacement amount) between the coordinate values of the latest tracking point and the coordinate values of the tracking point obtained immediately before the latest tracking point is less than a predetermined value, the displacement value is determined as having converged and the repetitive tracking point detection is terminated. This process is repeated for each hierarchical tier image, enabling more correct tracking of the feature point.

However, the easiness of convergence of a tracking point displacement amount varies depending on the image patterns around the feature point and the tracking point (for example, image signal (brightness) distribution). In a hierarchical gradient method, a tracking point is repeatedly detected for each hierarchical tier of an inverted pyramid hierarchical tier image group, and thus, use of the aforementioned method incurs the waste of excessive repetition of the tracking point detection process and the displacement calculation process, resulting in inefficiency.

SUMMARY OF THE INVENTION

The present invention has been made in view of such circumstances, and an object of the present invention is to provide an image processing apparatus, an image processing method and a programmable storage medium tangibly embodying a program of machine-readable instructions executable by a digital processing apparatus to perform an image processing method, which enable efficient feature point tracking by taking the easiness of convergence of a displacement amount according to the image pattern into account in a hierarchical gradient method.

In order to achieve the above object, a first aspect of the present invention provides an image processing apparatus comprising: an image obtaining device that obtains a first image and a second image; a hierarchical tier image creating device that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing; a tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a sequential detection device that performs the tracking point detection by the tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting device includes: a displacement calculating device that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image; a detection result outputting device that stops the repetitive tracking point detection by the displacement calculating device when the displacement amount converges on a value of less than a first threshold value or the repetition count of the tracking point position detection reaches not less than a second threshold value, and outputs a value of each of the displacement amount and the repetition count for the point of time of stopping the repetitive detection; and a criterion setting device that sets the first threshold value for the case where the tracking point detection by the tracking point detecting device is performed for first and second hierarchical tier images in the first and second hierarchical tier image groups, respectively, the first and second hierarchical tier images having a second resolution that is higher than the first resolution, according to the value of each of the displacement amount and the repetition count output from the detection result outputting device.

According to the first aspect, the easiness of tracking point tracking is determined from the value of the displacement amount between tracking points and the value of the repetition count, which have been obtained as a result of repetitive detection of a tracking point in a predetermined hierarchical tier, and if the tracking point is determined to be difficult to track (for example, when the value of the displacement amount is not less than a threshold value or when the repetition count of displacement calculation is not less than a threshold value), the value of the first threshold value used for displacement convergence determination is properly set, which makes the convergence of the displacement amount easy in the next hierarchical tier, enabling suppression of an increase in repetition count. Consequently, high-speed tracking point detection processing can be provided.

A second aspect of the present invention provides the image processing apparatus according to the first aspect, wherein when the value of the displacement amount output from the detection result outputting device is smaller than a third threshold value, the criterion setting device sets the first threshold value to be smaller than the first threshold value for the case where the displacement amount is not less than the third threshold value.

According to the second aspect, the first threshold value used for displacement convergence determination is properly set according to the displacement amount between tracking points obtained as a result of repetitive detection of a tracking point in a predetermined hierarchical tier, which makes the convergence of the displacement amount easy in the next hierarchical tier, enabling suppression of an increase in repetition count. Consequently, high-speed tracking point detection processing can be provided.

A third aspect of the present invention provides the image processing apparatus according to the first or second aspect, wherein when the value of the repetition count output from the detection result outputting device is smaller than a fourth threshold value the criterion setting device sets the first threshold value to be smaller than the first threshold value for the case where the repetition count is not less than the fourth threshold value.

According to the third aspect, the first threshold value used for displacement convergence determination is properly set according to the value of the repetition count of tracking point detection obtained as a result of repetitive detection of a tracking point in a predetermined hierarchical tier, which makes the convergence of the displacement amount easy in the next hierarchical tier, enabling suppression of an increase in repetition count. Consequently, high-speed tracking point detection processing can be provided.

A fourth aspect of the present invention provides the image processing apparatus according to the first to third aspects, further comprising a hierarchical tier selecting device that selects a hierarchical tier that is a next target for performing the tracking point detection by the tracking point detecting device according to the value of each of the displacement amount and the repetition count output from the detection result outputting device.

According to the fourth aspect, whether or not a tracking point can easily be tracked is determined from the result of detection of the tracking point in a predetermined hierarchical tier, and if the tracking point is determined to be easy to track, the next tracking target hierarchical tier is set to a hierarchical tier with a resolution higher than that of the next higher-level hierarchical tier, enabling reduction of the number of tracking point detection target hierarchical tiers. Consequently, high-speed tracking point detection processing can be provided.

A fifth aspect of the present invention provides an image processing apparatus comprising: an image obtaining device that obtains a first image and a second image; a hierarchical tier image creating device that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing; a tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a sequential detection device that performs the tracking point detection by the tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting device includes: a displacement calculating device that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image; and a detection result outputting device that stops the repetitive tracking point detection by the displacement calculating device when the displacement amount converges on a value of less than a first threshold value or the repetition count of the tracking point position detection reaches not less than a second threshold value, and outputs a value of each of the displacement amount and the repetition count for the point of time of stopping the repetitive detection, and wherein the image processing apparatus further comprises a hierarchical tier selecting device that selects a hierarchical tier that is a next target for performing the tracking point detection by the tracking point detecting device according to the value of each of the displacement amount and the repetition count output from the detection result outputting device.

According to the fifth aspect, whether or not a tracking point can easily be tracked is determined from the result of detection of the tracking point in a predetermined hierarchical tier, and if the tracking point is determined to be easy to track, the next tracking target hierarchical tier is set to a hierarchical tier with a resolution higher than that of the next higher-level hierarchical tier, enabling reduction of the number of tracking point detection target hierarchical tiers. Consequently, high-speed tracking point detection processing can be provided.

A sixth aspect of the present invention provides the image processing apparatus according to the fifth aspect, wherein the value of the displacement amount output from the detection result outputting device is smaller than a fifth threshold value, the hierarchical tier selecting device sets the hierarchical tier that is a next target for performing the tracking point detection by the tracking point detecting device to a hierarchical tier that is two or more levels higher than the current target hierarchical tier.

According to the sixth aspect, when the value of the displacement amount between tracking points obtained as a result of repetitive detection of a tracking point in a predetermined hierarchical tier is sufficiently small, the tracking point is determined to be easy to track, the next tracking target hierarchical tier is set to a hierarchical tier with a resolution higher than that of the next higher-level hierarchical tier, enabling reduction of the number of tracking point detection target hierarchical tiers. Consequently, high-speed tracking point detection processing can be provided.

A seventh aspect of the present invention provides the image processing apparatus according to the fifth or sixth aspect, wherein when the value of the repetition count output from the detection result outputting device is smaller than a sixth threshold value, the hierarchical tier selecting device sets the hierarchical tier that is a next target for performing the tracking point detection by the tracking point detecting device to a hierarchical tier that is two or more levels higher than the current target hierarchical tier.

According to the seventh aspect, when the value of the repetition count of tracking point detection obtained as a result of repetitive detection of a tracking point in a predetermined hierarchical tier is sufficiently small, the tracking point is determined to be easy to track, the next tracking target hierarchical tier is set to a hierarchical tier with a higher resolution than that of the next higher-level hierarchical tier, enabling reduction of the number of tracking point detection target hierarchical tiers. Consequently, high-speed tracking point detection processing can be provided.

An eighth aspect of the present invention provides an image processing apparatus comprising: an image obtaining device that obtains a first image, a second image and a third image, the second image and the third image being taken temporally before and after the first image being taken; a first hierarchical tier image creating device that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing; a first tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a first sequential detection device that performs the tracking point detection by the first tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image; a movement amount calculating device that calculates an amount of movement between the first image and the second image based on the positions of the feature point and the tracking point in the first and second images, and estimates an amount of movement between the first image and the third image; a hierarchical tier count setting device that sets a hierarchical tier count for hierarchical tier images created from the third image, based on the amount of movement between the first image and the third image; a second hierarchical tier image creating device that creates a number of third hierarchical tier images with different resolutions by subjecting the third image to stepwise reduction processing, the number corresponding to the hierarchical tier count set by the hierarchical tier count setting device, to create a third hierarchical tier image group; a second tracking point detecting device that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection device that performs the tracking point detection by the second tracking point detecting device for hierarchical tier images included in each of the first and third hierarchical tier image groups in increasing order of resolution while reflecting the result of tracking point detection in a hierarchical tier image with a lower resolution, to detect a position of a tracking point in the third image, the tracking point corresponding to a feature point in the first image.

According to the eighth aspect, when detecting a tracking point for three or more images taken in temporal succession, the amount of position movement between images that are current tracking point detection targets is estimated from the result of past tracking point detection, and the number of hierarchical tiers for hierarchical tier images created from the third image is determined based on the movement amount, eliminating the need to create extra hierarchical tiers. Consequently, an image memory capacity can be saved, as well as the number of tracking target hierarchical tiers can be reduced, enabling provision of high-speed tracking point detection processing.

A ninth aspect of the present invention provides the image processing apparatus according to the eighth aspect, wherein the hierarchical tier count setting device sets the hierarchical tier count so as to become larger as the amount of movement is larger.

A tenth aspect of the present invention provides the image processing apparatus according to the eighth or ninth aspect, wherein the movement amount calculating device creates a motion vector representing a displacement direction and displacement amount of the feature point based on each of the positions of the feature points and the tracking points for the first and second images, and calculates an average value or median value of the motion vectors as the amount of movement.

An eleventh aspect of the present invention provides an image processing apparatus according to the eighth to tenth aspects, wherein the movement amount calculating device estimates that the amount of movement between the first image and the second image and the amount of movement between the first image and the third image are equal to each other.

A twelfth aspect of the present invention provides an image processing apparatus comprising: an image obtaining device that obtains a first image, a second image and a third image, the second image and the third image being taken temporally before and after the first image being taken; a hierarchical tier image creating device that creates a first hierarchical tier image group including a plurality of first hierarchical tier images with different resolutions by subjecting the first image to stepwise reduction processing, creates a second hierarchical tier image group including a plurality of second hierarchical tier images with different resolutions by subjecting the second image to stepwise reduction processing, and creates a third hierarchical tier image group including a plurality of third hierarchical tier images with different resolutions by subjecting the third image to stepwise reduction processing; a first tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a first sequential detection device that performs the tracking point detection by the first tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image; a movement amount calculating device that calculates an amount of movement between the first image and the second image based on the positions of the feature point and the tracking point in the first and second images, and estimates an amount of movement between the first image and the third image; a starting hierarchical tier setting device that sets a starting hierarchical tier to start feature point detection for the first image and the third image, based on the amount of movement between the first image and the third image; a second tracking point detecting device that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection device that performs the tracking point detection by the second tracking point detecting device starting from a hierarchical tier image in the starting hierarchical tier in increasing order of resolution while reflecting the result of tracking point detection in a hierarchical tier image with a lower resolution, to detect a position of a tracking point in the third image, the tracking point corresponding to a feature point in the first image.

According to the twelfth aspect, when detecting a tracking point for three or more images taken in temporal succession, the amount of feature point (tracking point) displacement expected to occur between images, which are the next tracking point detection targets, is estimated from the result of past tracking point detection, and the hierarchical tier to start tracking is set based on the displacement amount. Consequently, the number of tracking point detection target hierarchical tiers can be reduced, enabling provision of high-speed tracking point detection processing.

A thirteenth aspect of the present invention provides the image processing apparatus according to the twelfth aspect, wherein the starting hierarchical tier setting device sets a hierarchical tier including a hierarchical tier image with a lower resolution to the starting hierarchical tier as the amount of movement is larger.

A fourteenth aspect of the present invention provides the image processing apparatus according to the twelfth or thirteenth aspect, wherein the movement amount calculating device estimates that the amount of movement between the first image and the second image and the amount of movement between the first image and the third image are equal to each other.

A fifteenth aspect of the present invention provides an image processing method comprising: an image obtaining step of obtaining a first image and a second image; a hierarchical tier image creating step of creating a first hierarchical tier image group including a plurality of first hierarchical tier images with different resolutions by subjecting the first image to stepwise reduction processing, and creating a second hierarchical tier image group including a plurality of second hierarchical tier images with different resolutions by subjecting the second image to stepwise reduction processing; a tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a sequential detection step of performing the tracking point detection in the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting step includes: a displacement calculating step of repeatedly detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculating a displacement amount representing a distance between a latest tracking point detected as a result of a detection repetition and a tracking point obtained as a result of a detection repetition before the detection repetition in the second image; a detection result outputting step of stopping the repetitive tracking point detection in the displacement calculating step when the displacement amount converges on a value of less than a first threshold value or the repetition count of the tracking point position detection reaches not less than a second threshold value, and outputting a value of each of the displacement amount and the repetition count for the point of time of stopping the repetitive detection; and a criterion setting step of setting the first threshold value for the case where the tracking point detection in the tracking point detecting step is performed for first and second hierarchical tier images in the first and second hierarchical tier image groups, respectively, the first and second hierarchical tier images having a second resolution that is higher than the first resolution, according to the value of each of the displacement amount and the repetition count output in the detection result outputting step.

A sixteenth aspect of the present invention provides the image processing method according to the fifteenth aspect, wherein the criterion setting step includes, when the value of the displacement amount output in the detection result outputting step is smaller than a third threshold value, setting the first threshold value to be smaller than the first threshold value for the case where the displacement amount is not less than the third threshold value.

A seventeenth aspect of the present invention provides the image processing method according to the fifteenth or sixteenth aspect, wherein the criterion setting step includes, when the value of the repetition count output in the detection result outputting step is smaller than a fourth threshold value, setting the first threshold value to be smaller than the first threshold value for the case where the repetition count is not less than the fourth threshold value.

An eighteenth aspect of the present invention provides the image processing method according to the fifteenth to seventeenth aspects, further comprises a hierarchical tier selecting step of selecting a hierarchical tier that is a next target for performing the tracking point detection in the tracking point detecting step according to the value of each of the displacement amount and the repetition count output in the detection result outputting step.

A nineteenth aspect of the present invention provides an image processing method comprising: an image obtaining step of obtaining a first image and a second image; a hierarchical tier image creating step of creating a first hierarchical tier image group including a plurality of first hierarchical tier images with different resolutions by subjecting the first image to stepwise reduction processing, and creating a second hierarchical tier image group including a plurality of second hierarchical tier images with different resolutions by subjecting the second image to stepwise reduction processing; a tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a sequential detection step of performing the tracking point detection in the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting step includes: a displacement calculating step of repeatedly detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculating a displacement amount representing a distance between a latest tracking point detected as a result of a detection repetition and a tracking point obtained as a result of a detection repetition before the detection repetition in the second image; and a detection result outputting step of stopping the repetitive tracking point detection in the displacement calculating step when the displacement amount converges on a value of less than a first threshold value or the repetition count of the tracking point position detection reaches not less than a second threshold value, and outputting a value of each of the displacement amount and the repetition count for the point of time of stopping the repetitive detection, and wherein the image processing method further comprises a hierarchical tier selecting step of selecting a hierarchical tier that is a next target for performing the tracking point detection in the tracking point detecting step according to the value of each of the displacement amount and the repetition count output in the detection result outputting step.

A twentieth aspect of the present invention provides the image processing method according to the nineteenth aspect, wherein the hierarchical tier selecting step includes, when the value of the displacement amount output in the detection result outputting step is smaller than a fifth threshold value, setting the hierarchical tier that is a next target for performing the tracking point detection in the tracking point detecting step to a hierarchical tier that is two or more levels higher than the current target hierarchical tier.

A twenty-first aspect of the present invention provides the image processing method according to the nineteenth or twentieth aspect, wherein the hierarchical tier selecting step includes, when the value of the repetition count output in the detection result outputting step is smaller than a sixth threshold value, setting the hierarchical tier that is a next target for performing the tracking point detection in the tracking point detecting step to a hierarchical tier that is two or more levels higher than the current target hierarchical tier.

A twenty-second aspect of the present invention provides an image processing method comprising: an image obtaining step of obtaining a first image, a second image and a third image, the second image and the third image being taken temporally before and after the first image being taken; a first hierarchical tier image creating step of creating a first hierarchical tier image group including a plurality of first hierarchical tier images with different resolutions by subjecting the first image to stepwise reduction processing, and creating a second hierarchical tier image group including a plurality of second hierarchical tier images with different resolutions by subjecting the second image to stepwise reduction processing; a first tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a first sequential detection step of performing the tracking point detection in the first tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image; a movement amount calculating step of calculating an amount of movement between the first image and the second image based on the positions of the feature point and the tracking point in the first and second images, and estimating an amount of movement between the first image and the third image; a hierarchical tier count setting step of setting a hierarchical tier count for hierarchical tier images created from the third image, based on the amount of movement between the first image and the third image; a second hierarchical tier image creating step of creating a number of third hierarchical tier images with different resolutions by subjecting the third image to stepwise reduction processing, the number corresponding to the hierarchical tier count set by the hierarchical tier count setting step, to create a third hierarchical tier image group; a second tracking point detecting step of detecting a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step of performing the tracking point detection in the second tracking point detecting step for hierarchical tier images included in each of the first and third hierarchical tier image groups in increasing order of resolution while reflecting the result of tracking point detection in a hierarchical tier image with a lower resolution, to detect a position of a tracking point in the third image, the tracking point corresponding to a feature point in the first image.

A twenty-third aspect of the present invention provides the image processing method according to the twenty-second aspect, wherein the hierarchical tier count setting step includes setting the hierarchical tier count so as to become larger as the amount of movement is larger.

A twenty-fourth aspect of the present invention provides an image processing method comprising: an image obtaining step of obtaining a first image, a second image and a third image, the second image and the third image being taken temporally before and after the first image being taken; a hierarchical tier image creating step of creating a first hierarchical tier image group including a plurality of first hierarchical tier images with different resolutions by subjecting the first image to stepwise reduction processing, creating a second hierarchical tier image group including a plurality of second hierarchical tier images with different resolutions by subjecting the second image to stepwise reduction processing, and creating a third hierarchical tier image group including a plurality of third hierarchical tier images with different resolutions by subjecting the third image to stepwise reduction processing; a first tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a first sequential detection step of performing the tracking point detection in the first tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image; a movement amount calculating step of calculating an amount of movement between the first image and the second image based on the positions of the feature point and the tracking point in the first and second images, and estimating an amount of movement between the first image and the third image; a starting hierarchical tier setting step of setting a starting hierarchical tier to start feature point detection for the first image and the third image, based on the amount of movement between the first image and the third image; a second tracking point detecting step of detecting a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step of performing the tracking point detection in the second tracking point detecting step starting from a hierarchical tier image in the starting hierarchical tier in increasing order of resolution while reflecting the result of tracking point detection in a hierarchical tier image with a lower resolution, to detect a position of a tracking point in the third image, the tracking point corresponding to a feature point in the first image.

A twenty-fifth aspect of the present invention provides the image processing method according to the twenty-fourth aspect, wherein the starting hierarchical tier setting step including setting a hierarchical tier including a hierarchical tier image with a lower resolution to the starting hierarchical tier as the amount of movement is larger.

A twenty-sixth aspect of the present invention provides a programmable storage medium tangibly embodying a program of machine-readable instructions executable by a digital processing apparatus to perform an image processing method: an image obtaining step that obtains a first image and a second image; a hierarchical tier image creating step that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing; a tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a sequential detection step that performs the tracking point detection by the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting step includes: a displacement calculating step that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image; a detection result outputting step that stops the repetitive tracking point detection by the displacement calculating step when the displacement amount converges on a value of less than a first threshold value or the repetition count of the tracking point position detection reaches not less than a second threshold value, and outputs a value of each of the displacement amount and the repetition count for the point of time of stopping the repetitive detection; and a criterion setting step that sets the first threshold value for the case where the tracking point detection by the tracking point detecting step is performed for first and second hierarchical tier images in the first and second hierarchical tier image groups, respectively, the first and second hierarchical tier images having a second resolution that is higher than the first resolution, according to the value of each of the displacement amount and the repetition count by the detection result outputting step.

A twenty-seventh aspect of the present invention provides the programmable storage medium according to the twenty-sixth aspect, wherein when the value of the displacement amount output by the detection result outputting function is smaller than a third threshold value, the criterion setting function sets the first threshold value to be smaller than the first threshold value for the case where the displacement amount is not less than the third threshold value.

A twenty-eighth aspect of the present invention provides the programmable storage medium according to the twenty-sixth or twenty-seventh aspect, wherein when the value of the repetition count output by the detection result outputting function is smaller than a fourth threshold value the criterion setting function sets the first threshold value to be smaller than the first threshold value for the case where the repetition count is not less than the fourth threshold value.

A twenty-ninth aspect of the present invention provides the programmable storage medium according to the twenty-sixth to twenty-eighth aspects, further comprising: a hierarchical tier selecting step that selects a hierarchical tier that is a next target for performing the tracking point detection by the tracking point detecting step according to the value of each of the displacement amount and the repetition count output by the detection result outputting step.

A thirtieth aspect of the present invention provides a programmable storage medium tangibly embodying a program of machine-readable instructions executable by a digital processing apparatus to perform an image processing method: an image obtaining step that obtains a first image and a second image; a hierarchical tier image creating step that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing; a tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a sequential detection step that performs the tracking point detection by the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting step includes: a displacement calculating step that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image; and a detection result outputting step that stops the repetitive tracking point detection by the displacement calculating step when the displacement amount converges on a value of less than a first threshold value or the repetition count of the tracking point position detection reaches not less than a second threshold value, and outputs a value of each of the displacement amount and the repetition count for the point of time of stopping the repetitive detection, and wherein the image processing method further comprises a hierarchical tier selecting step that selects a hierarchical tier that is a next target for performing the tracking point detection by the tracking point detecting step according to the value of each of the displacement amount and the repetition count output by the detection result outputting step.

A thirty-first aspect of the present invention provides the programmable storage medium according to the thirtieth aspect, wherein when the value of the displacement amount output by the detection result outputting function is smaller than a fifth threshold value, the hierarchical tier selecting function sets the hierarchical tier that is a next target for performing the tracking point detection by the tracking point detecting function to a hierarchical tier that is two or more levels higher than the current target hierarchical tier.

A thirty-second aspect of the present invention provides the programmable storage medium according to the thirtieth or thirty-first aspect, wherein when the value of the repetition count output by the detection result outputting function is smaller than a sixth threshold value, the hierarchical tier selecting function sets the hierarchical tier that is a next target for performing the tracking point detection by the tracking point detecting function to a hierarchical tier that is two or more levels higher than the current target hierarchical tier.

A thirty-third aspect of the present invention provides a programmable storage medium tangibly embodying a program of machine-readable instructions executable by a digital processing apparatus to perform an image processing method: an image obtaining step that obtains a first image, a second image and a third image, the second image and the third image being taken temporally before and after the first image being taken; a first hierarchical tier image creating step that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing; a first tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a first sequential detection step that performs the tracking point detection by the first tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image; a movement amount calculating step that calculates an amount of movement between the first image and the second image based on the positions of the feature point and the tracking point in the first and second images, and estimates an amount of movement between the first image and the third image; a hierarchical tier count setting step that sets a hierarchical tier count for hierarchical tier images created from the third image, based on the amount of movement between the first image and the third image; a second hierarchical tier image creating step that creates a number of third hierarchical tier images with different resolutions by subjecting the third image to stepwise reduction processing, the number corresponding to the hierarchical tier count set by the hierarchical tier count setting step, to create a third hierarchical tier image group; a second tracking point detecting step that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step that performs the tracking point detection by the second tracking point detecting step for hierarchical tier images included in each of the first and third hierarchical tier image groups in increasing order of resolution while reflecting the result of tracking point detection in a hierarchical tier image with a lower resolution, to detect a position of a tracking point in the third image, the tracking point corresponding to a feature point in the first image.

A thirty-fourth aspect of the present invention provides the programmable storage medium according to the thirty-third aspect, wherein the hierarchical tier count setting step sets the hierarchical tier count so as to become larger as the amount of movement is larger.

A thirty-fifth aspect of the present invention provides a programmable storage medium tangibly embodying a program of machine-readable instructions executable by a digital processing apparatus to perform an image processing method: an image obtaining step that obtains a first image, a second image and a third image, the second image and the third image being taken temporally before and after the first image being taken; a hierarchical tier image creating step that creates a first hierarchical tier image group including a plurality of first hierarchical tier images with different resolutions by subjecting the first image to stepwise reduction processing, creates a second hierarchical tier image group including a plurality of second hierarchical tier images with different resolutions by subjecting the second image to stepwise reduction processing, and creates a third hierarchical tier image group including a plurality of third hierarchical tier images with different resolutions by subjecting the third image to stepwise reduction processing; a first tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; a first sequential detection step that performs the tracking point detection by the first tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image; a movement amount calculating step that calculates an amount of movement between the first image and the second image based on the positions of the feature point and the tracking point in the first and second images, and estimates an amount of movement between the first image and the third image; a starting hierarchical tier setting step that sets a starting hierarchical tier to start feature point detection for the first image and the third image, based on the amount of movement between the first image and the third image; a second tracking point detecting step that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step that performs the tracking point detection by the second tracking point detecting step starting from a hierarchical tier image in the starting hierarchical tier in increasing order of resolution while reflecting the result of tracking point detection in a hierarchical tier image with a lower resolution, to detect a position of a tracking point in the third image, the tracking point corresponding to a feature point in the first image.

A thirty-sixth aspect of the present invention provides the programmable storage medium according to the thirty-fifth aspect, wherein the starting hierarchical tier setting step sets a hierarchical tier including a hierarchical tier image with a lower resolution to the starting hierarchical tier as the amount of movement is larger.

According to the present invention, efficient feature point tracking can be performed by taking the easiness of convergence of a displacement amount according to the image pattern into account in a hierarchical tier-type gradient method. Consequently, the time required for the analysis of a moving object in motion picture frames taken in temporal succession or continuous shots, the processing for combining plural images using the position of a feature point to create a panoramic image or the processing for creating an all-in-focus image or an image with a shallow depth of field from images taken via focusing bracketing can be reduced.

DETAILED DESCRIPTION OF THE PREFERRED EMBODIMENTS

Hereinafter, preferred embodiments of an image processing apparatus, an image processing method and an image processing program according to the present invention will be described with reference to the attached drawings.

First Embodiment

A first embodiment of the present invention is adapted so as to determine the easiness of convergence of the displacement amount of a tracking point corresponding to a feature point when repeatedly detecting the tracking point in a hierarchical tier image in a predetermined hierarchical tier, and change the criterion for determining whether or not the displacement amount converges, which is employed for repetitive tracking point detection for the next hierarchical tier image, according to this easiness of convergence.

Figure 1:
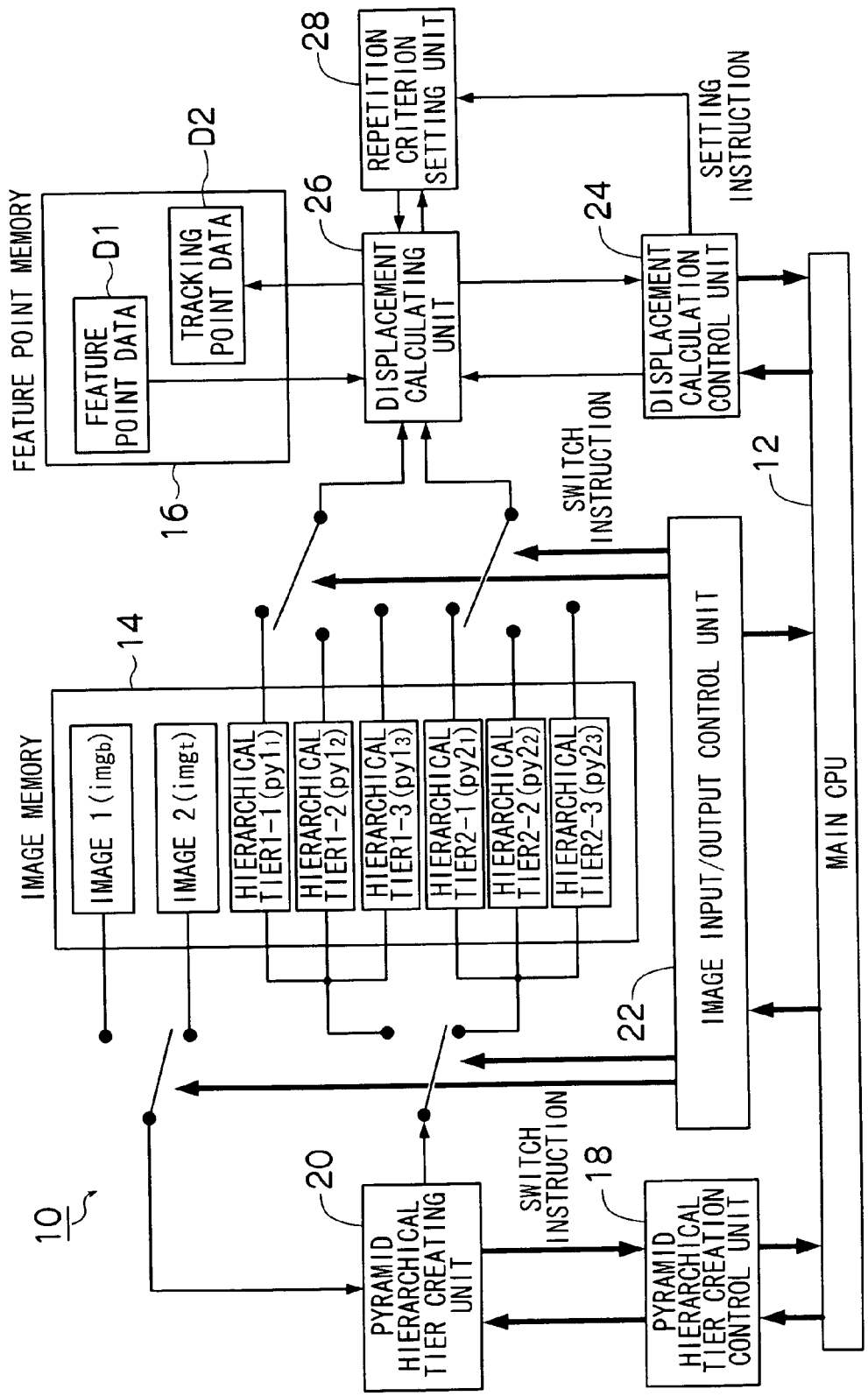
FIG. 1 is a block diagram illustrating an image processing apparatus according to a first embodiment of the present invention.

FIG. 1 is a block diagram illustrating an image processing apparatus according to the first embodiment of the present invention.

A main CPU 12 is an overall control unit that controls the operation of an entire image processing apparatus 10 according to the present embodiment. The main CPU 12 performs various kinds of arithmetic operations including, for example, the control of input/output of image data to/from an image memory 14, the setting of the hierarchical tier count and decimation ratio employed when creating a pyramid hierarchical tier images, and the control for a displacement calculation process.

A reference image ($img_b$) and a tracking image ($img_t$), which serve as feature point-tracking targets, are stored in the image memory 14. Also, a group of images ($py1_0$, $py1_1$, ... and $py2_0$, $py2_1$, ...) constituting pyramid hierarchical tiers created by a pyramid hierarchical tier creating unit 20 is stored in image memory 14.

An image input/output control unit 22 controls input/output of image data among the image memory 14, the pyramid hierarchical tier creating unit 20 and a displacement calculating unit 26.

Feature point data D1 and tracking point data D2 are stored in feature point memory 16. The feature point data D1 contains data of coordinates representing the positions of one or more feature points corresponding to the outline, or the position of the gravity center, of a subject appearing in the reference image ($img_b$). The feature point data D1 is prepared in advance by, for example, analyzing the image signal levels (brightness levels) in the reference image ($img_b$) to detect the subject. Also, the tracking point data D2 contains data of point coordinates representing the feature points (tracking points) in the tracking image ($img_t$), which have been calculated by the displacement calculating unit 26.

A pyramid hierarchical tier creation control unit 18 outputs an instruction to create pyramid hierarchical tier image groups to the pyramid hierarchical tier creating unit 20, in response to an instruction from the main CPU 12.

In response to the instruction from the pyramid hierarchical tier creation control unit 18, the pyramid hierarchical tier creating unit 20 reads the reference image ($img_b$) and the tracking image ($img_t$) from the image memory 14, and performs smoothing for the reference image ($img_b$) and the tracking image ($img_t$) using a low-pass filter and performs decimation for the reference image ($img_b$) and the tracking image ($img_t$) at a predetermined decimation ratio. Then, the pyramid hierarchical tier creating unit 20 creates pyramid hierarchical tier images $py1_0$ (the reference image ($img_b$) itself), $py1_1$ (an image obtained by subjecting the reference image ($img_b$) to smoothing and decimation at the predetermined decimation ratio once), $py1_2$ (an image obtained by subjecting the reference image ($img_b$) to smoothing and decimation at the predetermined decimation ratio twice), ... $py1_{py\_num-1}$ from the reference image ($img_b$), and also creates pyramid hierarchical tier images $py2_0$ (tracking image ($img_t$) itself), $py2_1$ (an image obtained by subjecting the tracking image ($img_t$) to smoothing and decimation at the predetermined decimation ratio once), $py2_2$ (an image obtained by subjecting tracking image ($img_t$) to smoothing and decimation at the predetermined decimation ratio twice), ... $py2_{py\_num-1}$ from the tracking image ($img_t$), and writes the images to the image memory 14. In the below description, the group of the pyramid hierarchical tier images $py1_0$ (reference image ($img_b$)), $py1_1$, $py1_2$, ... $py1_{py\_num-1}$ created from the reference image ($img_b$) is referred to as a reference pyramid $py1$, and the group of the pyramid hierarchical tier images $py2_0$ (tracking image ($img_t$)), $py2_1$, $py2_2$, ... $py2_{py\_num-1}$ created from the tracking image ($img_t$) is referred to as a tracking pyramid $py2$. The number of tiers of each pyramid hierarchy and the decimation ratio can be determined by a user.

Figure 2:
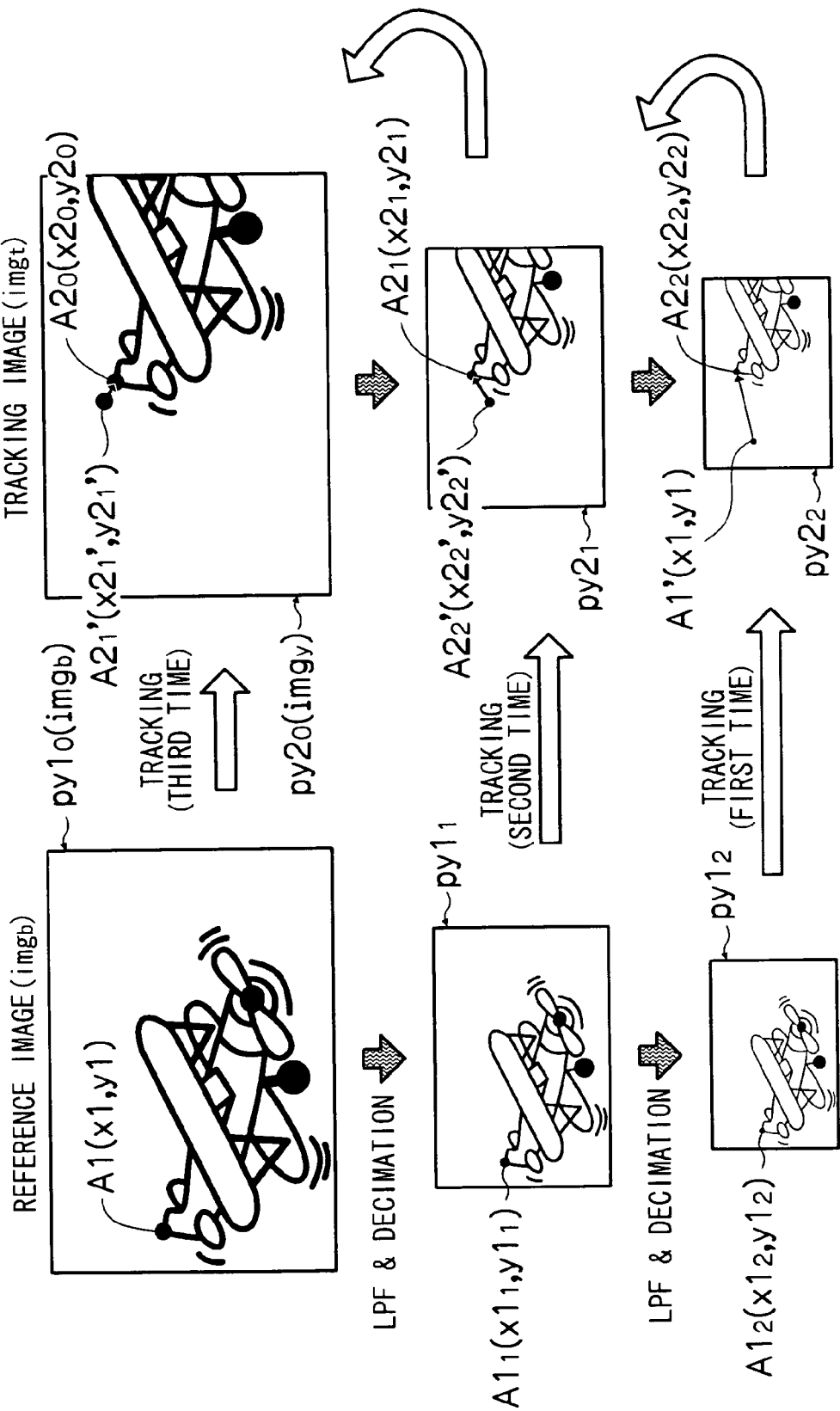
FIG. 2 is a diagram schematically illustrating a procedure of tracking a feature point according to a hierarchical gradient method.

As illustrated in FIG. 2, feature point tracking is performed sequentially starting from the lower-level hierarchical tier image. Then, the result of the feature point tracking for the lower-level hierarchical tier image is reflected in feature point tracking for the next higher-level hierarchical tier. For example, the position of a tracking point that has been detected in the lower-level hierarchical tier image is set as the initial position of a tracking point in the next hierarchical tier.

A displacement calculation control unit 24 outputs an instruction to perform feature point tracking to the displacement calculating unit 26, in response to an instruction from the main CPU 12.

In response to the instruction from the displacement calculation control unit 24, the displacement calculating unit 26 reads the hierarchical tier image with the smallest image size (hereinafter, referred to as the lowest hierarchical tier image) from each of the reference pyramid $py1$ and the tracking pyramid $py2$ in the image memory 14, and repeatedly detects a tracking point using a gradient method. Then, the displacement calculating unit 26 repeatedly calculates the displacement amount ($dx_i$, $dy_i$) of the feature point, and outputs the value of the repetition count $inum_{last}$ of tracking point detection until convergence of the displacement amount ($dx_i$, $dy_i$) and the value of the displacement amount ($dx_{last}$, $dy_{last}$) for the point of time of convergence to a repetition criterion setting unit 28.

The repetition criterion setting unit 28 changes the criterion for determination of displacement amount convergence based on the repetition count $inum_{last}$ and displacement amount ($dx_{last}$, $dy_{last}$) input from the displacement calculating unit 26. The displacement calculating unit 26 reads the upper hierarchical tier image and detects a tracking point according to the convergence determination criterion set by the repetition criterion setting unit 28. Then, the above-described repetitive tracking point detection and convergence determination criterion setting change are repeated. Consequently, the repetition count of repetitive tracking point detection is suppressed.

Figure 3:
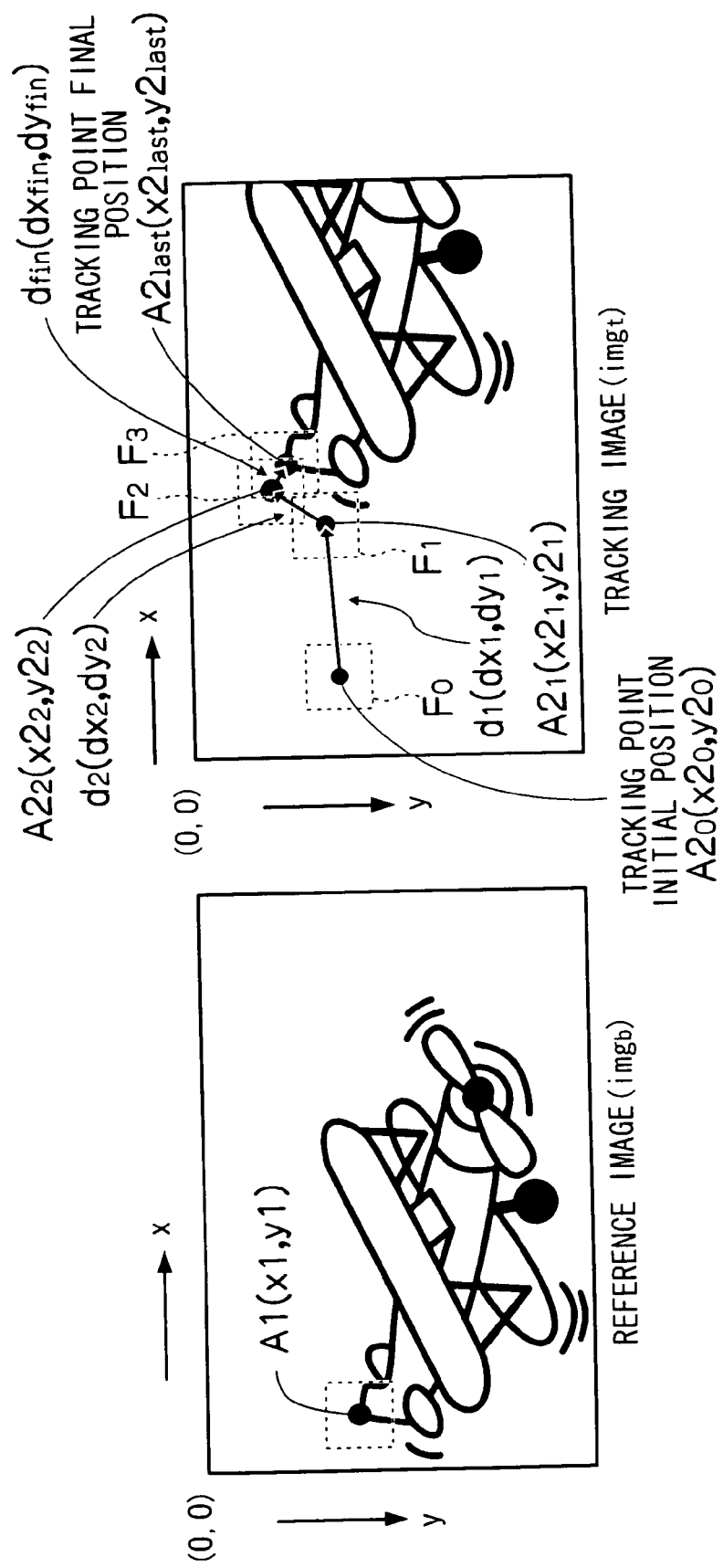
FIG. 3 is a diagram schematically illustrating a procedure of feature point tracking for each hierarchical tier.

FIG. 3 is a diagram schematically illustrating the procedure of feature point tracking for each hierarchical tier. In the below description, the upper left point in each image is the origin (0, 0), the x-axis represent the horizontal direction, and the y-axis represents the vertical direction.

As illustrated in FIG. 3, the coordinates of a feature point A1 in the reference image ($img_b$) is set to (x1, y1), and the coordinates of a feature point (tracking point) A2 at an initial position $A2_0$ in the tracking image ($img_t$) is set to (x2, y2), which is equal to (x1, y1). Then, a gradient method using the gradients of image signals is repeatedly performed for the feature point A1, and the areas around the tracking points $A2_0$, $A2_1$ ... (square frames $F_0$, $F_1$ ... in the Figure). Then, the values of the displacement amount ($dx_i$, $dy_i$) between a tracking point Ai (x$2_i$, y$2_i$) detected in the i-th displacement calculation, and a tracking point $A_{i-1}$ (x$2_{i-1}$, y$2_{i-1}$) detected in the (i−1)-th displacement calculation is monitored, and when each of these values is smaller than a predetermined value, it is determined that the position of the tracking point has sufficiently converged, and the repetitive tracking point detection is terminated. The displacement amount ($dx_{total}$, $dy_{total}$) of the tracking point A2 from the initial position $A2_0$ to the final position $A2_{last}$ can be figured out according to expressions (1-1a) and (1-1b) below:

$$dx_{total} = \Sigma dx_i \quad (1\text{-}1a)$$

$$dy_{total} = \Sigma dy_i \quad (1\text{-}1b)$$

Accordingly, the coordinates (x2, y2) of the final position $A2_{last}$ of the tracking point can be figured out according to expressions (1-2a) and (1-2b) below.

$$x2 = x1 + dx_{total} \quad (1\text{-}2a)$$

$$y2 = y1 + dy_{total} \quad (1\text{-}2b)$$

Figure 4:
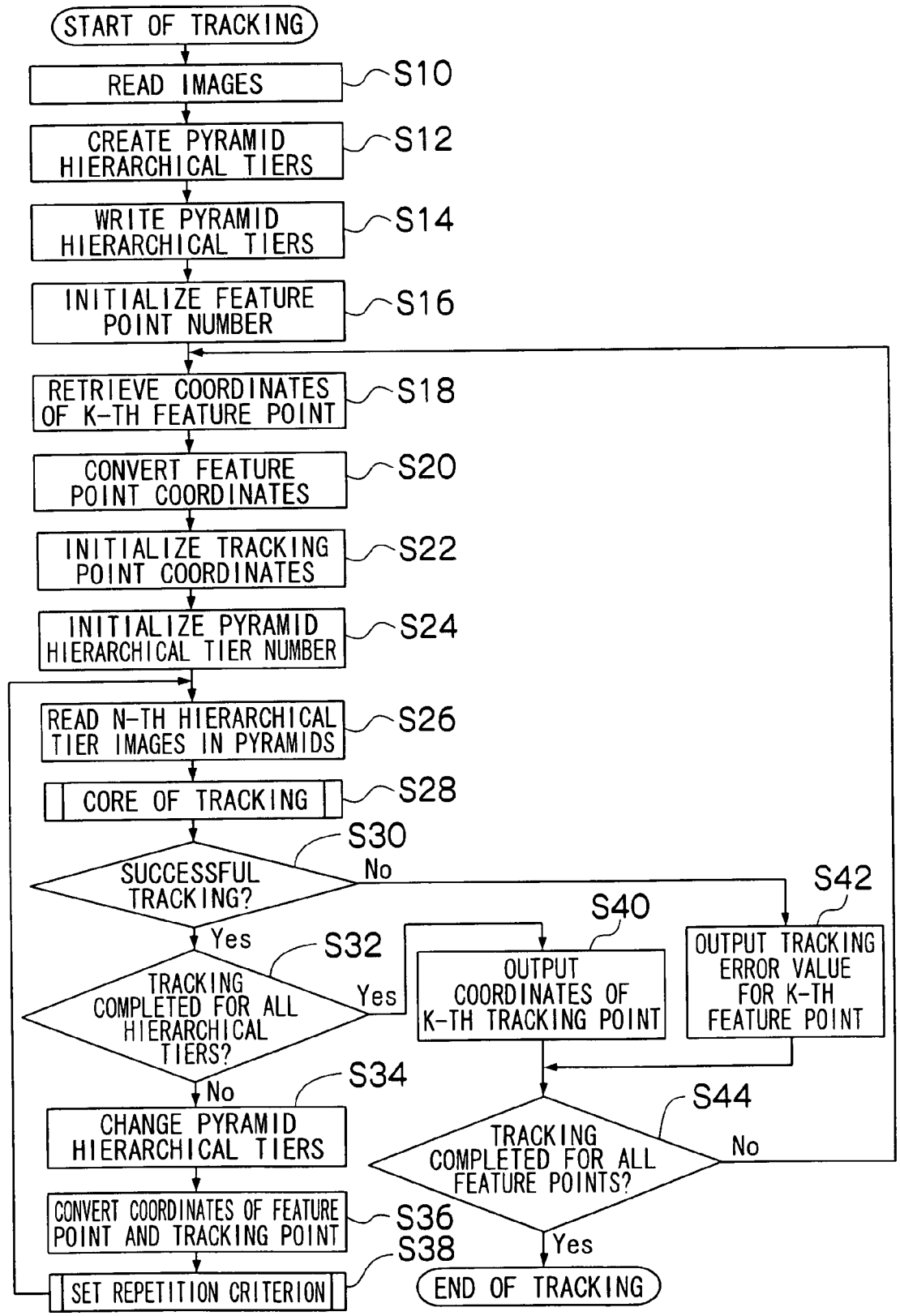
FIG. 4 is a flowchart illustrating an image processing method according to a first embodiment of the present invention.

Hereinafter, an image processing method according to the present embodiment will be described with reference to the flowcharts in FIGS. 4 to 6. FIG. 4 is a flowchart illustrating an image processing method according to the first embodiment of the present invention.

First, the pyramid hierarchical tier creating unit 20 reads a reference image ($img_b$) and a tracking image ($img_t$) from the image memory 14 in response to an instruction from the pyramid hierarchical tier creation control unit 18 (step S10). Then, the pyramid hierarchical tier creating unit 20 creates hierarchical tier images $py1_1$, $py1_2$, ... $py1_n$, ... $py1_{py\_num-1}$ by means of stepwise reduction of the reference image ($img_b$). Also, the pyramid hierarchical tier creating unit 20 creates hierarchical tier images $py2_1$, $py2_2$, ... $py2_n$, ... $py2_{py\_num-1}$ by means of stepwise reduction of the tracking image ($img_t$). Consequently, a reference pyramid py1 and a tracking pyramid py2 are created (step S12). Here, n represents the number of hierarchical tiers in each pyramid, and the image size of the hierarchical tier image becomes smaller as the hierarchical tier number n is larger. The total number of hierarchical tier images (the number of hierarchical tiers) included in each pyramid is py-num. Also, hierarchical tier images with the same hierarchical tier number-n have the same image size.

At step S12, the pyramid hierarchical tier creating unit 20 repeatedly performs smoothing for the reference image 1 ($img_b$) and the tracking image 2 ($img_t$) using a smoothing filter, and pixel decimation at a predetermined decimation ratio for stepwise image reduction of the reference image 1 ($img_b$) and the tracking image 2 ($img_t$) to create hierarchical tier images. In the present embodiment, the smoothing filter (low-pass filter) is a Gaussian filter, and the decimation ratio is ½ for both the vertical and horizontal directions. The smoothing filter type and the decimation ratio are not limited to these.

Next, the pyramid hierarchical tier creating unit 20 writes the hierarchical tier images in the reference pyramid py1 and the tracking pyramid py2, which have been created at step S12, to the image memory 14 (step S14).

Next, a feature point number k is initialized (k=0) (step S16). In response to an instruction from the displacement calculation control unit 24, the displacement calculating unit 26 retrieves the coordinates (x1, y1) of the k-th feature point from among the coordinates of a plurality of feature points stored in the feature point memory 16 (step S18). Here, the coordinate values of feature points stored in the feature point memory 16 are those for the zeroth hierarchical tier $py1_0$ (the image with the largest image size (reference image ($img_b$)) in the pyramid.

Next, the displacement calculating unit 26 converts the coordinates (x1, y1) of the feature point retrieved at step S18 into coordinate values for the lowest resolution hierarchical tier (the py_num−1-th hierarchical tier) in the pyramid hierarchical tier according to expressions (1-3a) and (1-3b) below (step S20).

$$x1 \leftarrow x1/2^{(py\_num-1)} \quad (1\text{-}3a)$$

$$y1 \leftarrow y1/2^{(py\_num-1)} \quad (1\text{-}3b)$$

In expressions (1-3a) and (1-3b) above, since hierarchical tier images are created at a decimation ratio of 1/2, the coordinates (x1, y1) are divided by a power of "2". If the decimation ratio takes another value (for example, 1/a), the coordinates (x1, y1) may be divided by a power of "a".

Next, the coordinates of the feature point (x2, y2) (the coordinates of the initial position of the tracking point) in the tracking image are initialized, and (x2, y2) is set to (x1, y1) (step S22). Also, the pyramid hierarchical tier number is initialized (n←py_num−1) (step S24).

Next, the displacement calculating unit 26 reads the hierarchical tier images $py1_n$ and $py2_n$ in the reference pyramid py1 and the tracking pyramid py2 sequentially starting from the images with the smallest image size (n=py_num−1), from the image memory 14 (step S26), and performs processing for feature point tracking (tracking core process: step S28).

Figure 5:
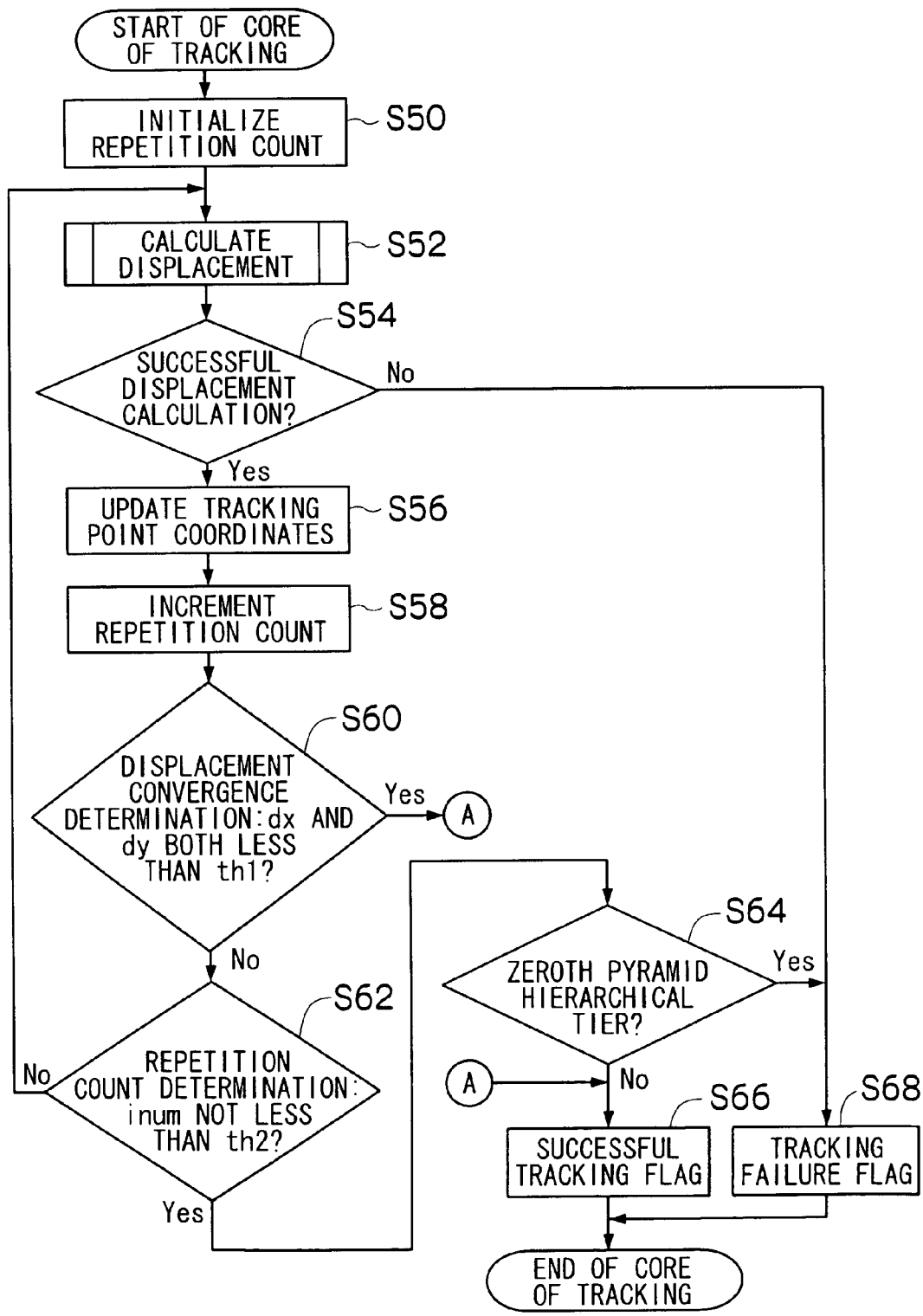
FIG. 5 is a flowchart illustrating a tracking core process.

FIG. 5 is a flowchart illustrating the tracking core process at step S28.

As illustrated in FIG. 5, in the tracking core process, first, the repetition count inum is initialized (inum=0) (step S50).

Next, the displacement calculating unit 26 detects a feature point (tracking point) in the hierarchical tier image $py2_n$ in the tracking pyramid for the hierarchical tier images $py1_n$ and $py2_n$ read at step S26, based on the gradients of the image signals (gradient method). Then, the displacement calculating unit 26 calculates the displacement amount (dx, dy) between the coordinates (x$2_{inum}$, y$2_{inum}$) of the detected tracking point and the coordinates (x$2_{inum-1}$, y$2_{inum-1}$) of the tracking point obtained in the immediately preceding loop (step S52). Here, where n=py_num−1 and it is the first loop (inum=0), the coordinates (x$2_{inum-1}$, y$2_{inum-1}$) are set to the initial position (x1, y1) at step S22. Also, where n<py_num−1 and it is the first loop (inum=0), the coordinates (x$2_{inum-1}$, $y2_{inum-1}$) are set to the feature point coordinates ($x2_{last}$, $y2_{last}$) obtained using the immediately preceding (lower-level) hierarchical tier image.

In general, a gradient method involves a division, and when the denominator of a division becomes close to 0, the calculation result may diverge. Accordingly, if the denominator of the division is close to 0, resulting in divergence of the obtained displacement amount (No at step S54), such case is determined as a displacement calculation error and a "tracking failure flag" is posted (step S68). The displacement calculation control unit 24, upon detection of the "tracking failure flag", forcibly terminates the tracking of the feature point.

Meanwhile, if the displacement amount has been calculated without divergence (Yes at step S54), the displacement calculating unit 26 updates the coordinates (x2, y2) of the tracking point according to expressions (1-4a) and (1-4b) below (step S56).

$$x2 \leftarrow x2+dx \quad (1\text{-}4a)$$

$$y2 \leftarrow y2+dy \quad (1\text{-}4b)$$

Also, as indicated in expression (1-5) below, the repetition count inum is updated (incremented) (step S58).

$$inum \leftarrow inum+1 \quad (1\text{-}5)$$

Next, the displacement calculating unit 26 compares the displacement (dx, dy) and a first threshold value th1, and determines whether or not the displacement has converged, according to <Condition 1> below (step S60).

IF (dx<th1) AND (dy<th1) THEN Terminate displacement calculation (the displacement determined as having converged) <Condition 1>

ELSE Continue displacement calculation (the displacement is determined as not having converged yet)

If the displacement amount values dx and dy are both less than the threshold value th1, that is, if the displacement amount has converged (Yes at step S60), a "successful tracking flag" is posted (step S66). The displacement calculation control unit 24, upon detection of the "successful tracking flag", terminates the feature point tracking for the n-th hierarchical tier.

Meanwhile, the displacement amount value dx or dy is not less than the threshold value th1, that is, when the displacement has not converged (No at step S60), the displacement calculating unit 26 makes a repetition count determination according to <Condition 2> below (step S62). Here, a threshold value th2 is the upper limit value of the displacement calculation repetition count inum.

IF (inum<th2) THEN Continue displacement calculation (the repetition count inum is less than the upper limit value th2) <Condition 2>

ELSE Terminate displacement calculation (the repetition count inum is not less than the upper limit value th2)

If the repetition count inum is less than the threshold value th2, that is, if the displacement calculation continues (No at step S62), the processing at steps S52 to S62 is repeated until the displacement amount (dx, dy) converges (Yes at step S60) or the repetition count inum reaches a value that is not less than the upper limit value th2 (Yes in step S62).

If the repetition count inum is not less than the threshold value th2, that is, if the displacement calculation is terminated (Yes at step S62), where the tracking point detection target is the hierarchical tier image in the zeroth hierarchical tier (the hierarchical tier image with the largest image size (highest resolution)) (Yes at step S64), a "tracking failure flag" is posted (step S68). Meanwhile, the tracking point detection target is an image other than the hierarchical tier image in the zeroth hierarchical tier (No at step S64), a "successful tracking flag" is posted (step S66). Essentially, the termination of repetitive calculation of the displacement amount as a result of the repetition count inum reaching a value that is not less than the threshold value th2 (Yes at step S62) despite the displacement amount not having converged yet (No at step S60) means that the displacement amount has not sufficiently converged, and thus, it should be determined that the tracking was failed. However, in the present embodiment, if there remains the next hierarchical tier (No at step S64), there remains the possibility of the displacement amount converging in the next hierarchical tier, and thus, the tracking is not forcibly determined as a failure.

Through the tracking core processing in FIG. 5, a flag indicating whether or not the tracking is successful (successful tracking flag/tracking failure flag), and if the tracking is successful, the final tracking point ($x2_{last}$, $y2_{last}$) in the n-th hierarchical tier can be obtained.

As a result of the tracking core processing, if the "tracking failure flag" has been posted, that is, the tracking of the k-th feature point was failed (No at step S30), the displacement calculating unit 26 outputs an tracking error value and writes it to the feature point memory 16 (step S42).

Meanwhile, a "successful tracking flag" has been posted (Yes at step S30), that is, if the repetition was terminated as a result of the displacement amount having converged or the repetition count inum reaching a value that is not less than the upper limit value th2 (which is expressed by "the repetition criterion has been met" in the below description), the displacement calculating unit 26 holds the latest values of the displacement amount ($dx_{last}$, $dy_{last}$) and the repetition count $inum_{last}$.

Subsequently, the tier number of the next tracking target pyramid hierarchical tier is set (n←n−1)(step S34), and the coordinates of the feature point (x1, y1), and the tracking point (x2, y2) obtained through the tracking core process at step S28 (FIG. 3) are converted into coordinate values in the next feature point tracking target hierarchical tier according to conversion equations (1-6a) to (1-6d) below (step S36).

$$x1 \leftarrow x1 \times 2 \quad (1\text{-}6a)$$

$$y1 \leftarrow y1 \times 2 \quad (1\text{-}6b)$$

$$x2 \leftarrow x2 \times 2 \quad (1\text{-}6c)$$

$$y2 \leftarrow y2 \times 2 \quad (1\text{-}6d)$$

The number "2" in conversion equations (1-6a) to (1-6d) above is the reciprocal of the decimation ratio employed for pyramid hierarchical tier creation. Where the decimation ratio takes another value (for example, 1/a), the respective coordinates are multiplied by "a".

Next, the displacement calculation control unit 24 accesses the displacement calculating unit 26 to provide an instruction to give the values of the latest displacement amount ($dx_{last}$, $dy_{last}$) and repetition count $inum_{last}$ held in the displacement calculating unit 26 to the repetition criterion setting unit 28. The repetition criterion setting unit 28 sets the value of the repetition criterion (threshold value th1) for displacement calculation determination for the next hierarchical tier based on the values of the displacement amount ($dx_{last}$, $dy_{last}$) and the repetition count $inum_{last}$ (step S38).

Then, if the tracking of the k-th feature point has been completed for all the hierarchical tier images as a result of repetition of the process at steps S26 to S38 (Yes in step S32), the displacement calculating unit 26 outputs the coordinate values (x2, y2) of the final tracking point (step S40). Meanwhile, if the tracking failure flag has been detected (No at step S30), the displacement calculating unit 26 outputs a tracking error value (step S42).

Next, the process at steps S18 to S42 is executed also for the other feature points stored in the feature point memory 16. The displacement calculating unit 26 outputs the coordinate values of the tracking points corresponding to the respective feature points or tracking error values. Upon completion of the tracking of all the feature points stored in the feature point memory 16 (Yes at step S44), the feature point tracking is fully completed.

Figure 6:
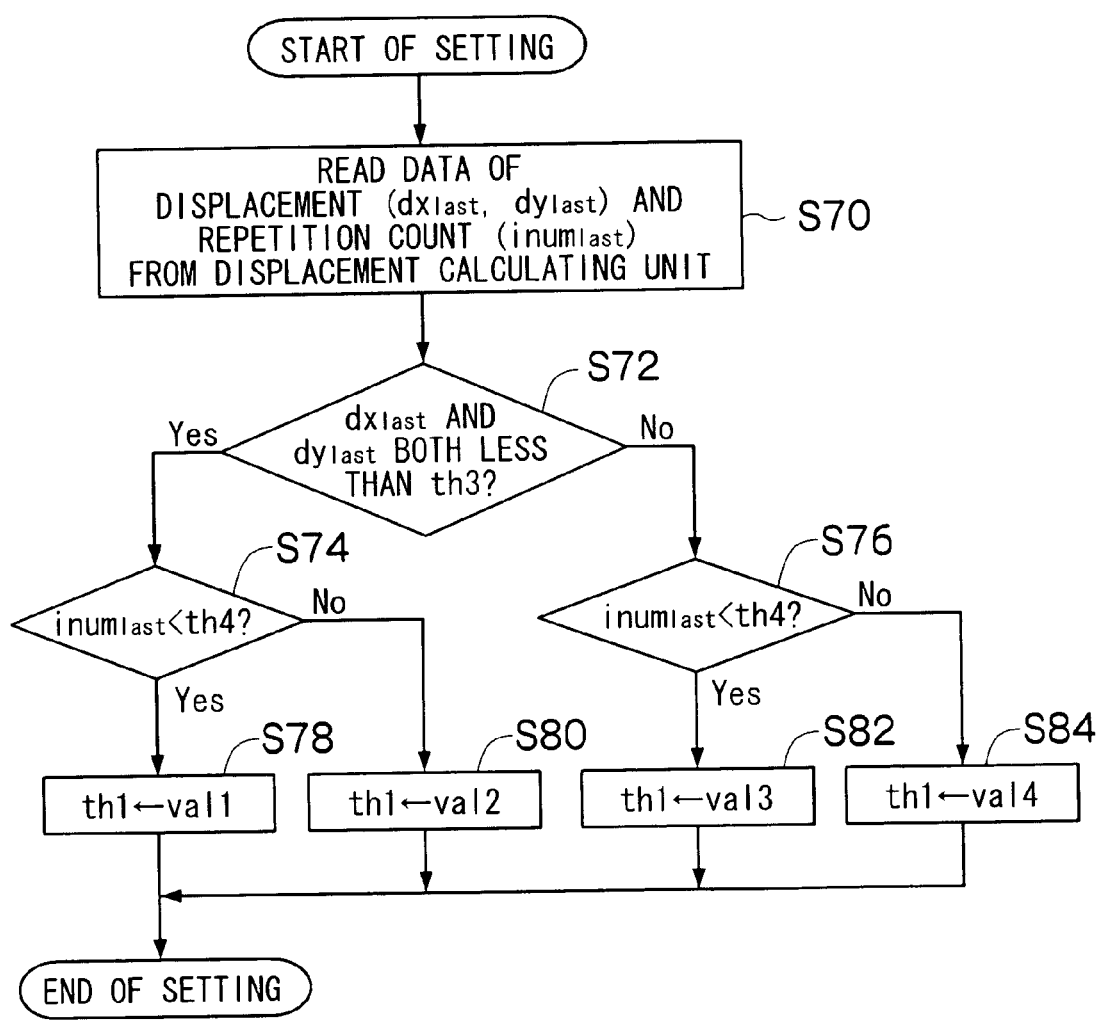
FIG. 6 is a flowchart illustrating the details of a repetition criterion setting process.

FIG. 6 is a flowchart illustrating the details of the repetition criterion setting process at step S38.

First, the displacement calculation control unit 24 detects that the repetition criterion has been met in the tracking of a feature point in a predetermined hierarchical tier, and provides the displacement calculating unit 26 with an instruction to give the values of the latest displacement ($dx_{last}$, $dy_{last}$) and repetition count $inum_{last}$ to the repetition criterion setting unit 28.

The repetition criterion setting unit 28, upon receipt of ($dx_{last}$, $dy_{last}$) and $inum_{last}$, first, compares a third threshold value th3 and ($dx_{last}$, $dy_{last}$) to determine which is smaller or larger (step S72), and then compares a fourth threshold value th4 and $inum_{last}$ to determine which is smaller or larger (steps S74 and S76). Then, the repetition criterion setting unit 28 changes the value of the first threshold value th1 according to the results of determination at steps S72 to S76.

TABLE 1

Threshold value th1 condition map

| Conditional branch 1 | $dx_{last} <$ th3 and $dy_{last} <$ th3 | | $dx_{last} \geq$ th3 or $dy_{last} \geq$ th3 | |
|---|---|---|---|---|
| Conditional branch 2 | $inum_{last} <$ th4 | $inum_{last} \geq$ th4 | $inum_{last} <$ th4 | $inum_{last} \geq$ th4 |
| Value of th1 | val1 | val2 | val3 | val4 |

Table 1 indicates conditional branches for repetition criterion setting in FIG. 6. In the present embodiment, val1<val2<val3<val4 (for example, val1=0.1, val1=0.25, val3=0.5 and val4=1). The magnitude relation among val1, val2, val3 and val4 and the values of val1, val2, val3 and val4 are not limited to the above.

(1) Conditional Branch 1 (Step S72)

If the values of the latest displacement amount ($dx_{last}$, $dy_{last}$) for the point of time when the repetition criterion has been met are both less than the predetermined value th3 (Yes at step S72), the displacement amount easily converges, that is, it can be considered easy to track the feature point. Therefore, the threshold value th1 used for displacement amount convergence determination is made to be smaller than the threshold value th1 for the case where at least one of the values of the displacement amount ($dx_{last}$, $dy_{last}$) is not less than the predetermined value th3 (No at step S72).

(2) Conditional Branch 2 (Steps S74 and S76)

If the value of the repetition count $inum_{last}$ until the repetition criterion has been met is not less than the predetermined value th4 (No at step S74 or No at step S76), the displacement amount can be considered hard to converge, that is, it can be considered hard to track the feature point. Therefore, if the threshold value th1 used for displacement amount convergence determination is made to be larger than the threshold value th1 for the case where the value of the repetition count $inum_{last}$ is less than the predetermined value th4 (Yes at step S74 or Yes at S76).

In the present embodiment, the easiness of tracking a feature point is determined from the values of $dx_{last}$, $dy_{last}$ and $inum_{last}$ obtained as a result of tracking the feature point in a predetermined hierarchical tier, and if it is determined hard to track the feature point (for example, where at least one of the values of the displacement amount ($dx_{last}$, $dy_{last}$) is not less than a threshold value or where the displacement calculation repetition count inum is not less than a threshold value), convergence of the displacement amount becomes easy in the next hierarchical tier by increasing the value of the threshold value th1 for displacement convergence determination, enabling suppression of an increase in the repetition count inum. Consequently, high-speed feature point tracking can be provided.

The upper limit value th2 of the repetition count may be changed according to the easiness of convergence of the displacement amount (for example, where the convergence is easy, the value of th2 is decreased, and where the convergence is difficult, the value of th2 is increased).

Second Embodiment

Next, a second embodiment of the present invention will be described. In the below description, a description of the components similar to those in the first embodiment will be omitted.

The present embodiment is adapted so as to determine the easiness of convergence of the displacement amount of a tracking point when repeatedly detecting the tracking point in a hierarchical tier image in a predetermined hierarchical tier, and determine the next tracking point detection target hierarchical tier according to this easiness of convergence.

Figure 7:
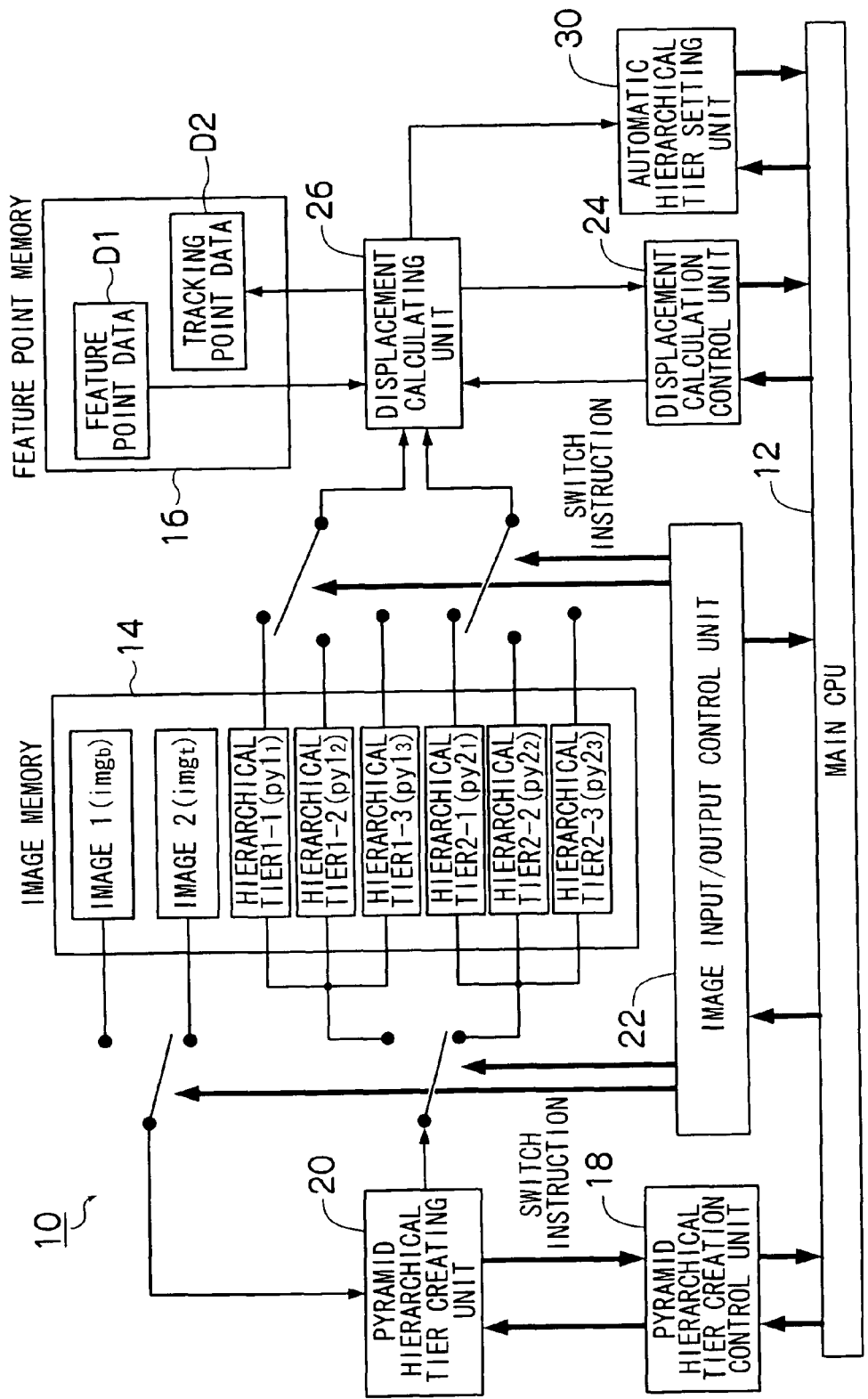
FIG. 7 is a block diagram illustrating an image processing apparatus according to a second embodiment of the present invention.

FIG. 7 is a block diagram illustrating an image processing apparatus according to the second embodiment of the present invention. As illustrated in FIG. 7, an image processing apparatus 10 according to the present embodiment includes an automatic hierarchical tier setting unit 30.

Figure 8:
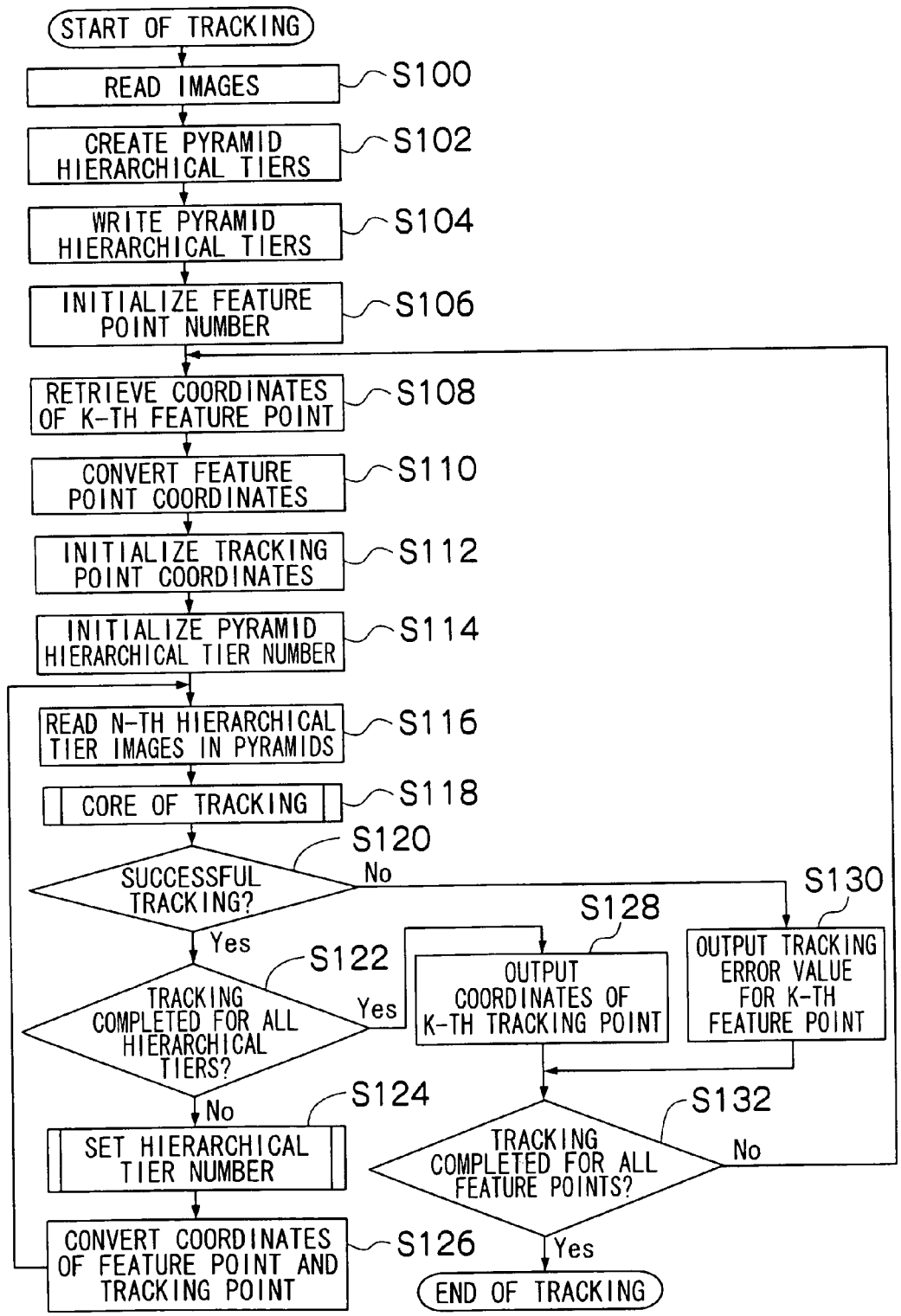
FIG. 8 is a flowchart illustrating an image processing method according to a second embodiment of the present invention.

Hereinafter, an image processing method according to the present embodiment will be described with reference to the flowcharts in FIGS. 8 to 10. FIG. 8 is a flowchart illustrating an image processing method according to the second embodiment of the present invention.

Steps S100 to S118 in FIG. 8 are similar to steps S10 to S28 in FIG. 4, respectively, and the tracking core process at step S118 is similar to the above-described tracking core process in FIG. 5, and thus, a description thereof will be omitted.

Upon completion of a tracking point detection in the n-th hierarchical tier, the tier number of the next tracking target hierarchical tier is set (step S124), and the coordinates of the feature point and the tracking point are converted (step S126). At step S124, a displacement calculation control unit 24 accesses a displacement calculating unit 26 to provide an instruction to give the values of the latest displacement amount ($dx_{last}$, $dy_{last}$) and repetition count $inum_{last}$ held by the displacement calculating unit 26 in the tracking core process at step S118 to the automatic hierarchical tier setting unit 30. The automatic hierarchical tier setting unit 30 sets the tier number n_new of the next tracking point detection target hierarchical tier based on the values of the displacement amount ($dx_{last}$, $dy_{last}$) and repetition count $inum_{last}$ (see FIGS. 9 and 10).

Next, the automatic hierarchical tier setting unit 30 calculates a coordinate conversion coefficient $conv_{coef}$ from the tier number n_new of the next tracking target hierarchical tier and the current target hierarchical tier number n according to expression (2-1) below.

$$conv_{coef} = 2^{(n-n\_new)}; \text{ (however, } n > n\_new\text{)} \quad (2\text{-}1)$$

The number "2" in conversion equation (2-1) above is the reciprocal of the decimation ratio employed for pyramid hierarchical tier creation. Where the decimation ratio takes another value (for example, 1/a), the coordinate conversion coefficient $conv_{coef} = a^{(n-n\_new)}$.

Then, the coordinates of the feature point (x1, y1) in the current target hierarchical tier image, and the tracking point (x2, y2) obtained through the tracking core process at step S118 are converted into coordinate values for the next feature point tracking target hierarchical tier according to conversion equations (2-2a) to (2-2d) below (step S126).

$$x1 \leftarrow x1 \times conv_{coef} \qquad (2\text{-}2a)$$

$$y1 \leftarrow y1 \times conv_{coef} \qquad (2\text{-}2b)$$

$$x2 \leftarrow x2 \times conv_{coef} \qquad (2\text{-}2c)$$

$$y2 \leftarrow y2 \times conv_{coef} \qquad (2\text{-}2d)$$

Then, if the tracking of the k-th feature point has been completed for all the hierarchical tier images as a result of repetition of the process at steps S116 to S126 (Yes at step S122), the displacement calculating unit 26 outputs the coordinate values (x2, y2) of the final tracking point (step S128). Meanwhile, if the tracking failure flag has been detected (No at step S120), the displacement calculating unit 26 outputs a tracking error value (step S130).

Next, the process at steps S108 to S130 is executed also for the other feature points stored in a feature point memory 16. The displacement calculating unit 26 outputs the coordinate values of the tracking points corresponding to the respective feature points or tracking error values. Upon completion of the tracking of all the feature points stored in the feature point memory 16 (Yes at step S132), the feature point tracking is fully completed.

Next, the process of setting the tier number of the tracking target hierarchical tier at step S124 will be described with reference to the flowcharts in FIGS. 9 and 10.

First, the displacement calculation control unit 24, upon detection of completion of feature point tracking (tracking core process) for a predetermined hierarchical tier as a result of the repetition criterion being met, provides the displacement calculating unit 26 with an instruction to give the values of the latest displacement amount ($dx_{last}$, $dy_{last}$) and repetition count $inum_{last}$, which have been held by the displacement calculating unit 26, to the automatic hierarchical tier setting unit 30.

Figure 9:
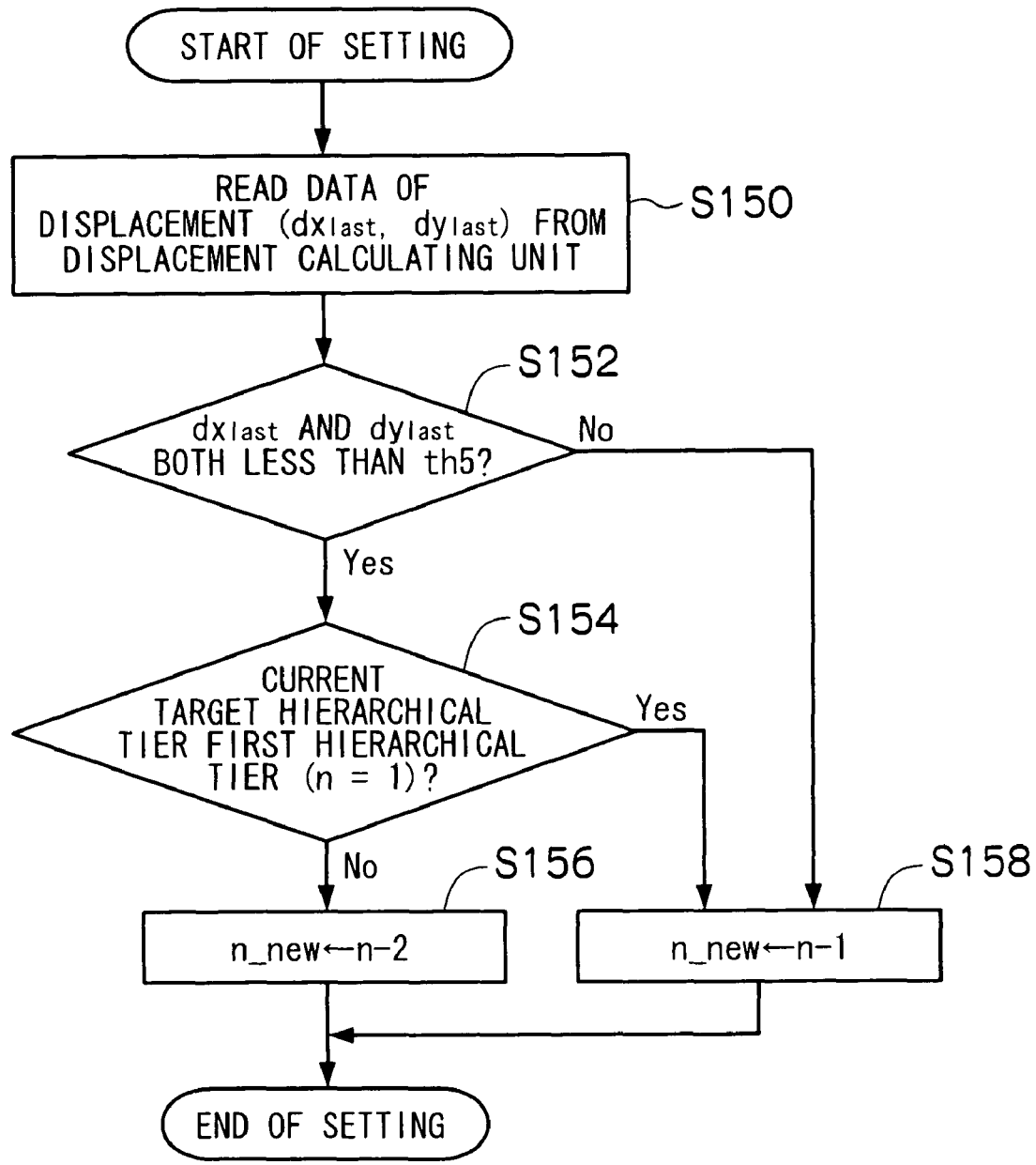
FIG. 9 is a flowchart illustrating a hierarchical tier number setting process for a tracking target hierarchical tier.

As illustrated in FIG. 9, the automatic hierarchical tier setting unit 30 reads the displacement amount ($dx_{last}$, $dy_{last}$) (step S150), and compares a threshold value th5 and the displacement amount ($dx_{last}$, $dy_{last}$) to determine which is larger or smaller (step S152). If the displacement amount values $dx_{last}$ and $dy_{last}$ are both less than the threshold value th5 (Yes at step S152) and the current target hierarchical tier (the n-th hierarchical tier) is a hierarchical tier of a level higher than the first hierarchical tier (No at step S154), the automatic hierarchical tier setting unit 30 sets the next feature point tracking target hierarchical tier (tier number n_new) to the hierarchical tier that is two levels higher than the current target hierarchical tier (tier number n) (step S156). Meanwhile, if at least one of the displacement amount values $dx_{last}$ and $dy_{last}$ is not less than the threshold value th5 (No at step S152), the automatic hierarchical tier setting unit 30 sets the next feature point tracking target hierarchical tier (tier number n_new) to the tier that is one level higher than the current target hierarchical tier (tier number n) (step S158).

Figure 10:
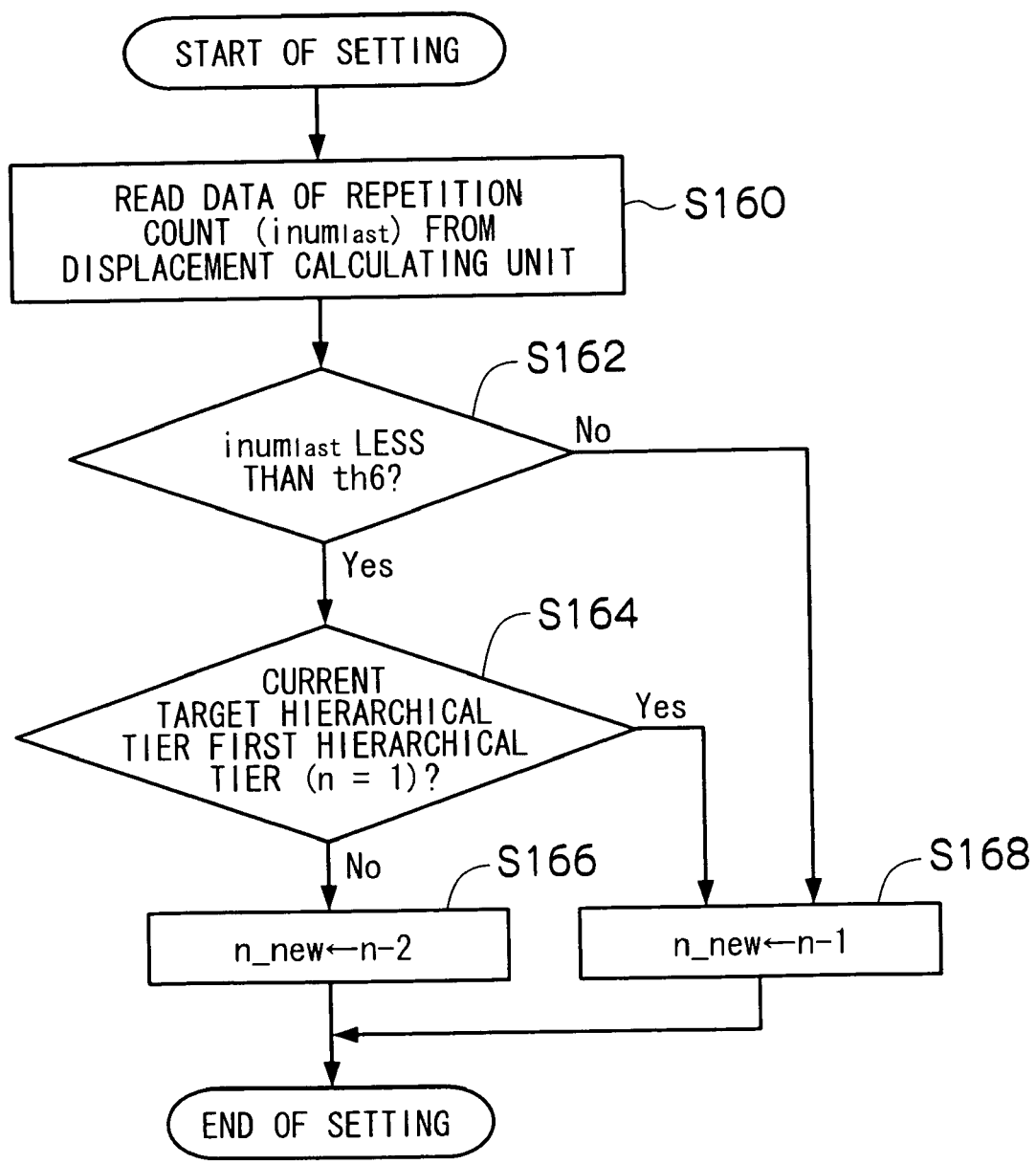
FIG. 10 is a flowchart illustrating a hierarchical tier number setting process for a tracking target hierarchical tier.

Also, as illustrated in FIG. 10, the automatic hierarchical tier setting unit 30 reads the value of the repetition count $inum_{last}$ (step S160) and compares a threshold value th6 and $inum_{last}$ to determine which is larger or smaller (step 162). If the repetition count $inum_{last}$ is less than the threshold value th6 (Yes at step S162) and the current target hierarchical tier (the n-th hierarchical tier) is a hierarchical tier of a level higher than the first hierarchical tier (No at step S164), the automatic hierarchical tier setting unit 30 sets the next feature point tracking target hierarchical tier (tier number n_new) to the hierarchical tier that is two levels higher than the current target hierarchical tier (tier number n) (step S166). Meanwhile, if the repetition count $inum_{last}$ is not less than the threshold value th6 (No at step S162), the automatic hierarchical tier setting unit 30 sets the next feature point tracking target hierarchical tier (tier number n_new) to the tier that is one level higher than the current target hierarchical tier (tier number n) (step S168).

TABLE 2

Hierarchical tier setting map
(for the case where the current target hierarchical tier is the n-th hierarchical tier)

| | Conditional branch 1 | | Conditional branch 2 | |
|---|---|---|---|---|
| | $dx_{last} <$ th5 and $dy_{last} <$ th5 | $dx_{last} \geq$ th5 or $dy_{last} \geq$ th5 | $inum_{last} <$ th6 | $inum_{last} \geq$ th6 |
| Next tracking target hierarchical tier | n_new ← n − 2 (However, where the current target hierarchical tier is the first hierarchical tier) n_new ← n − 1 | n_new ← n − 1 | n_new ← n − 2 (However, where the current target hierarchical tier is the first hierarchical tier) n_new ← n − 1 | n_new ← n − 1 |

Table 2 indicates conditional branches for feature point tracking target hierarchical tier setting in FIGS. 9 and 10.

(1) Conditional Branch 1

If the values of the latest displacement amount ($dx_{last}$, $dy_{last}$) for the point of time when the repetition criterion has been met are less than the threshold value th5, the displacement amount can be considered easy to converge, that is, it can be considered easy to track the feature point. Therefore, the next feature point tracking target hierarchical tier is set to the hierarchical tier that is two levels higher than the current target hierarchical tier, thereby reducing the number of feature point tracking target hierarchical tiers.

(2) Conditional Branch 2

If the repetition count $inum_{last}$ until the repetition criterion is met is less than the threshold value th6, the displacement amount can be considered easy to converge, that is, it can be considered easy to track the feature point. Therefore, the next feature point tracking target hierarchical tier is set to the hierarchical tier that is two levels higher than the current target hierarchical tier, thereby reducing the number of feature point tracking target hierarchical tiers.

Figure 11:
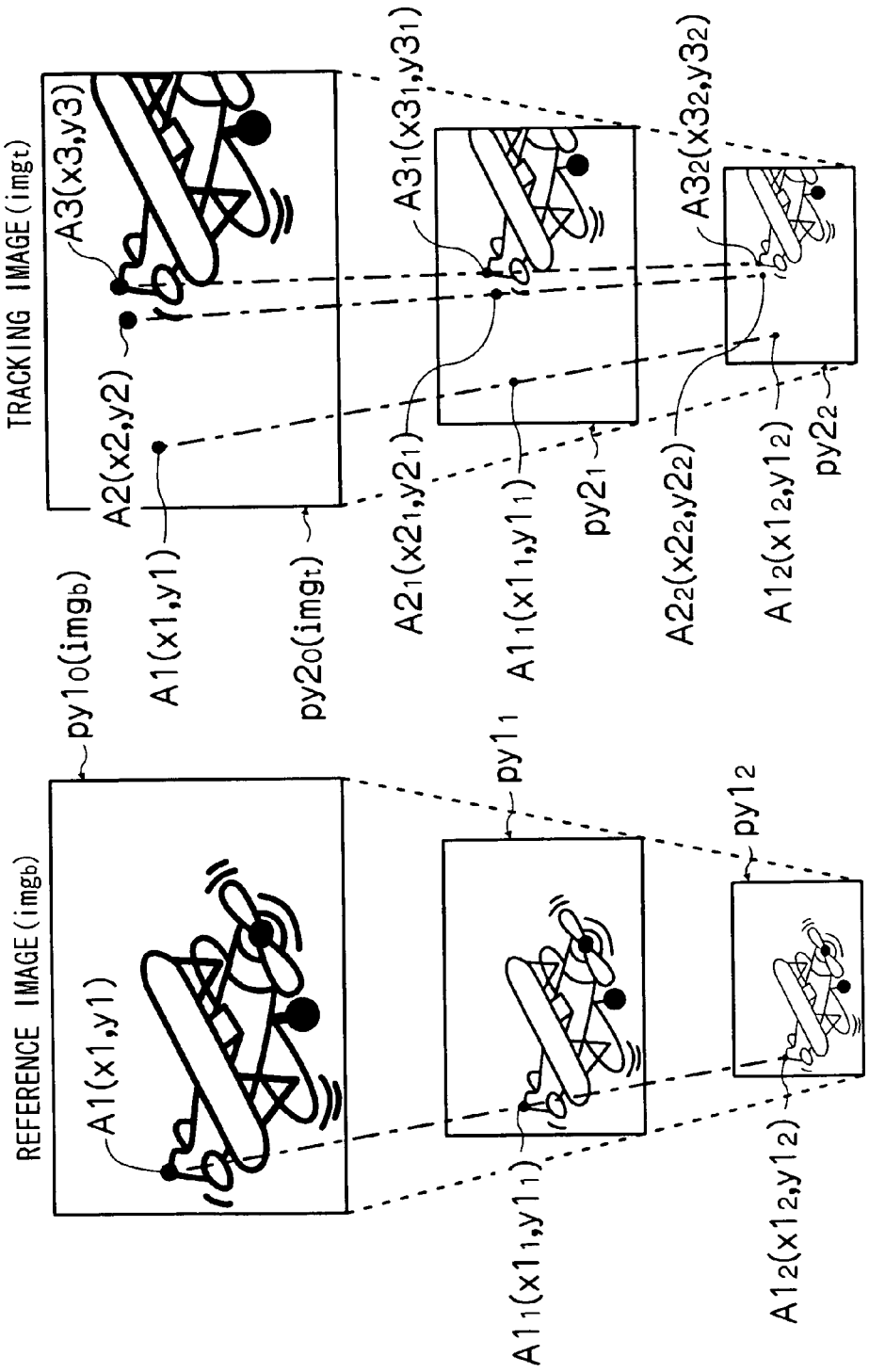
FIG. 11 is a diagram for describing a tracking error.

As illustrated in FIG. 11, a tracking point (x2, y2) obtained as a result of tracking a feature point (x1, y1) in a certain hierarchical tier should agree with the correct point (x3, y3), but in reality, an error may occur. It is assumed that the error between this correct point and the tracking point is a tracking error $[(x_{err}, y_{err}) = (x3-x2, y3-y2)]$.

As described above, when tracking is performed in the next hierarchical tier, the coordinates of these feature point and tracking point are converted by being multiplied by a coordinate conversion coefficient $conv_{coef}$. As a result, the tracking error is expanded by the amount of the multiplication by this coordinate conversion coefficient $conv_{coef}$, and thus, a large difference (gap) occurs between the tracking point and the correct point depending on the magnitude of the coordinate conversion coefficient $conv_{coef}$. As an empirical trend, in the case of a feature point that can easily be tracked (that converges with a small repetition count inum), tracking can be performed with good accuracy even if some tracking error occurs, while in the case of a feature point that is difficult to be tracked, it becomes difficult for the tracking point to converge because of the tracking error.

Therefore, according to this easiness of feature point tracking, in the case of a feature point that can easily be tracked, some tracking error is allowed to set the next tracking target to the hierarchical tier of two levels higher than the current target hierarchical tier, thereby omitting the tracking of the hierarchical tier that is one level higher than the current target hierarchical tier, enabling speed-up of the processing. Meanwhile, for a point that is difficult to be tracked, the next tracking target is set to the one-level higher hierarchical tier in order to keep the tracking error as small as possible in the next hierarchical tier. In the case of a feature point that can easily be tracked, the next feature point tracking target may be set to a hierarchical tier that is two or more levels higher than the current target hierarchical tier.

According to the present embodiment, whether or not a feature point can easily be tracked is determined from the result of tracking the feature point in a predetermined hierarchical tier, if it is determined that the feature point can easily be tracked, the next tracking target hierarchical tier is set to a hierarchical tier with a high resolution as is possible, rather than the next higher-level hierarchical tier, enabling reduction of the number of feature point tracking target hierarchical tiers. Consequently, high-speed feature point tracking can be provided.

Third Embodiment

Next, a third embodiment of the present invention will be described. In the below description, a description of the components similar to those in the first embodiment will be omitted.

The present embodiment is adapted so that when feature point tracking is performed for three images, that is, an image 1, an image 2 that is temporally older than the image 1, and an image 3 that is temporally newer than the image 1 (for example, images successively taken at substantially-equal time intervals, such as, for example, continuous shots or motion picture frames, or images successively taken while the apparatus being panned or tilted at substantially-equal intervals), the number of hierarchical tiers in pyramids (a reference pyramid and a tracking pyramid) created when performing tracking point detection between the image 1 and the image 3 is set according to the distance between the feature point and a tracking point (the movement amount of the feature point) obtained by performing feature point tracking between the image 1 and the image 2.

Figure 12:
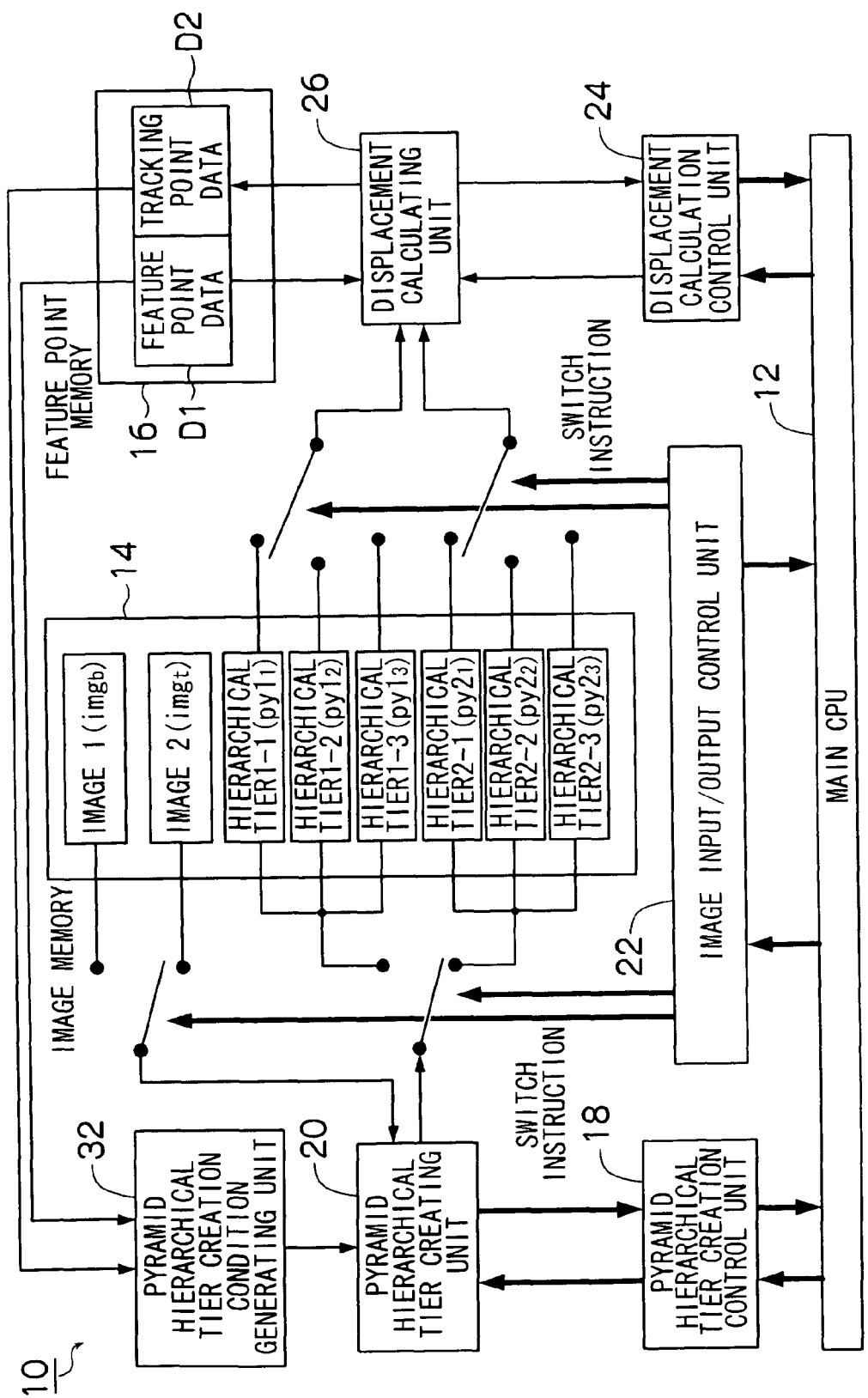
FIG. 12 is a block diagram illustrating an image processing apparatus according to a third embodiment of the present invention.

FIG. 12 is a block diagram illustrating an image processing apparatus according to the third embodiment of the present invention. As illustrated in FIG. 12, an image processing apparatus 10 according to the present embodiment includes a pyramid hierarchical tier creation condition generating unit 32.

Figure 13:
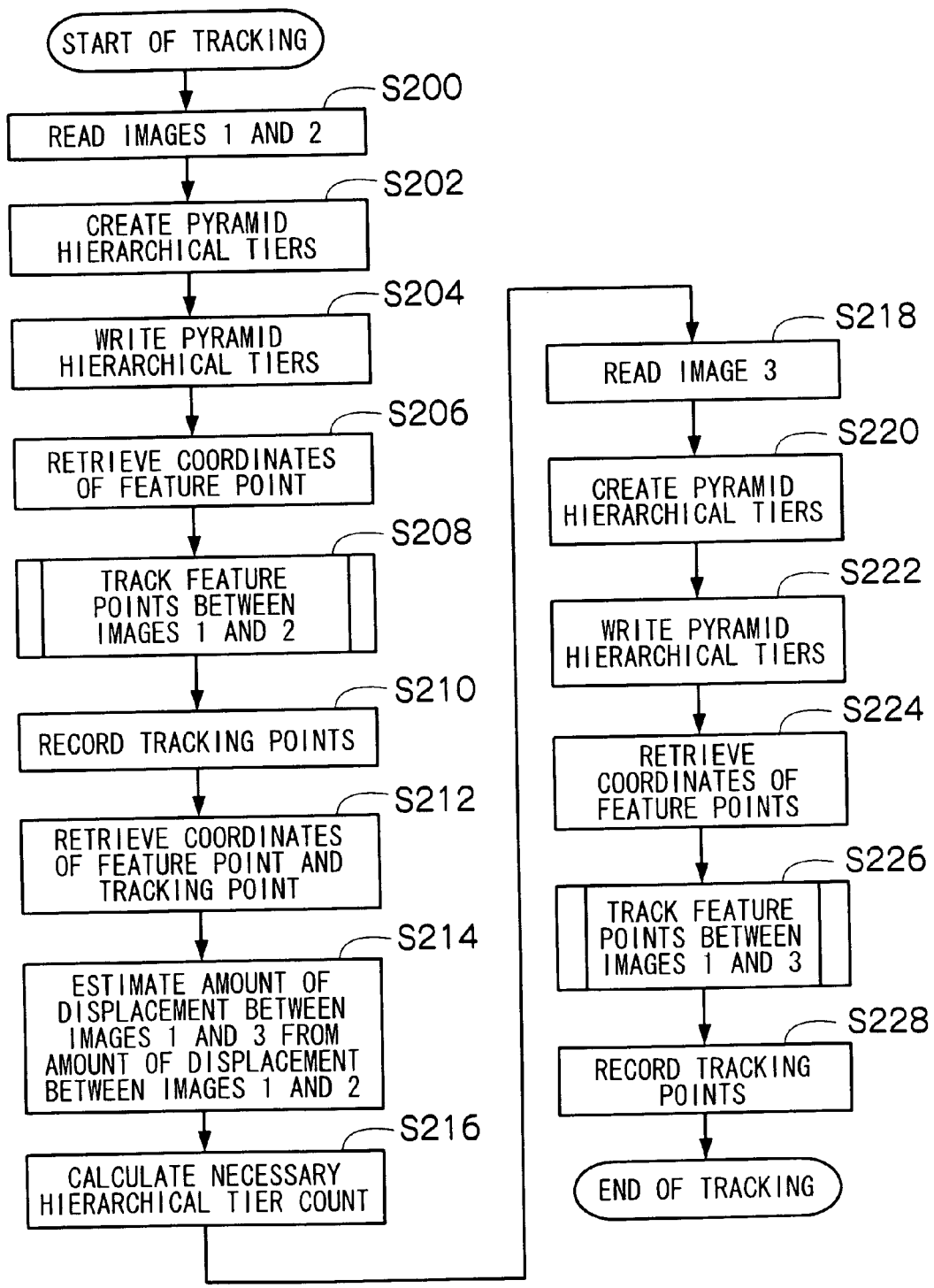
FIG. 13 is a flowchart illustrating an image processing method according to a third embodiment of the present invention.

Next, an image processing method according to the third embodiment of the present invention will be described with reference to the flowchart in FIG. 13.

First, a pyramid hierarchical tier creating unit 20 reads an image 1 and an image 2 (an image temporally older than the image 1) from an image memory 14 according to a pyramid hierarchical tier creation control unit 18 (step S200). Then, the pyramid hierarchical tier creating unit 20 creates hierarchical tier images $py1_1, py1_2, \ldots py1_n, \ldots py1_{py\_num-1}$ by means of stepwise reduction of the image 1. Also, the pyramid hierarchical tier creating unit 20 creates hierarchical tier images $py2_1, py2_2, \ldots py2_n, \ldots py2_{py\_num-1}$ by means of stepwise reduction of the image 2. Consequently, a reference pyramid py1 and a tracking pyramid py2 are created (step S202). Next, the pyramid hierarchical tier creating unit 20 writes the hierarchical tier images in the reference pyramid py1 and the tracking pyramid py2 created at step S202 to the image memory 14 (step S204).

Next, in response to an instruction from a displacement calculation control unit 24, a displacement calculating unit 26 retrieves the coordinates (x1, y1) of a plurality of feature points stored in a feature point memory 16 (step S206). Here, the coordinate values of the feature points stored in the feature point memory 16 are the coordinate values in the zeroth hierarchical tier $py1_0$ (the image with the largest image size (image 1)) in the pyramid.

Next, feature point tracking is performed between the image 1 and the image 2 (step S208), and the coordinates (x2, y2) of the tracking point obtained as a result of the feature point tracking are recorded in the feature point memory 16 (step S210). The feature point tracking process at step S208 is similar to the above-described feature point tracking process in FIGS. 4 and 5.

Next, the pyramid hierarchical tier creation condition generating unit 32 retrieves the coordinate values of a feature point and its tracking point recorded in the feature point memory 16 (step S212), and calculates a position movement (image movement) occurring between the image 1 and the image 2 as a translation amount ($trans12_x$, $trans12_y$) (step S214). Here, although a position movement is regarded as a translation amount, it may be regarded as an affine transformation amount or other transformation amount in order to take viewpoint rotation and/or scale variation (for example, zooming), etc., into account.

Here, examples of a translation amount calculation method will be described.

(1) First Example of the Translation Amount Calculation Method

First, the pyramid hierarchical tier creation condition generating unit 32 reads the coordinates ($x1_i$, $y1_i$) of the i-th feature point and the coordinates ($x2_i$, $y2_i$) of a tracking point corresponding to the feature point to calculate motion vectors $mv_i$ (=($mvx_i$, $mvy_i$)). Then, the pyramid hierarchical tier creation condition generating unit 32 calculates the translation amount ($trans12_x$, $trans12_y$) according to expressions (3-1a) and (3-1b) below. According to expressions (3-1a) and (3-1b) below, the amount of translation between the images corresponds to an average value of all the motion vectors $mv_i$.

$$trans12_x = \Sigma mvx_i / \Sigma 1 \quad (3\text{-}1a)$$

$$trans12_y = \Sigma mvy_i / \Sigma 1 \quad (3\text{-}1b)$$

(2) Second Example of the Translation Amount Calculation Method

The translation amount ($trans12_x$, $trans12_y$) is set to the median value (central value) of all the motion vectors $mv_i$ (=($mvx_i$, $mvy_i$)).

(3) Third Example of the Translation Amount Calculation Method

All the motion vectors are classified into categories (for example, the category of motion vectors arising from hand movement and the category of motion vectors arising from moving object movement), identifies the category with the largest number of vectors included therein, and calculates the aforementioned average value or median value only for the vectors included in the category.

Figure 14:
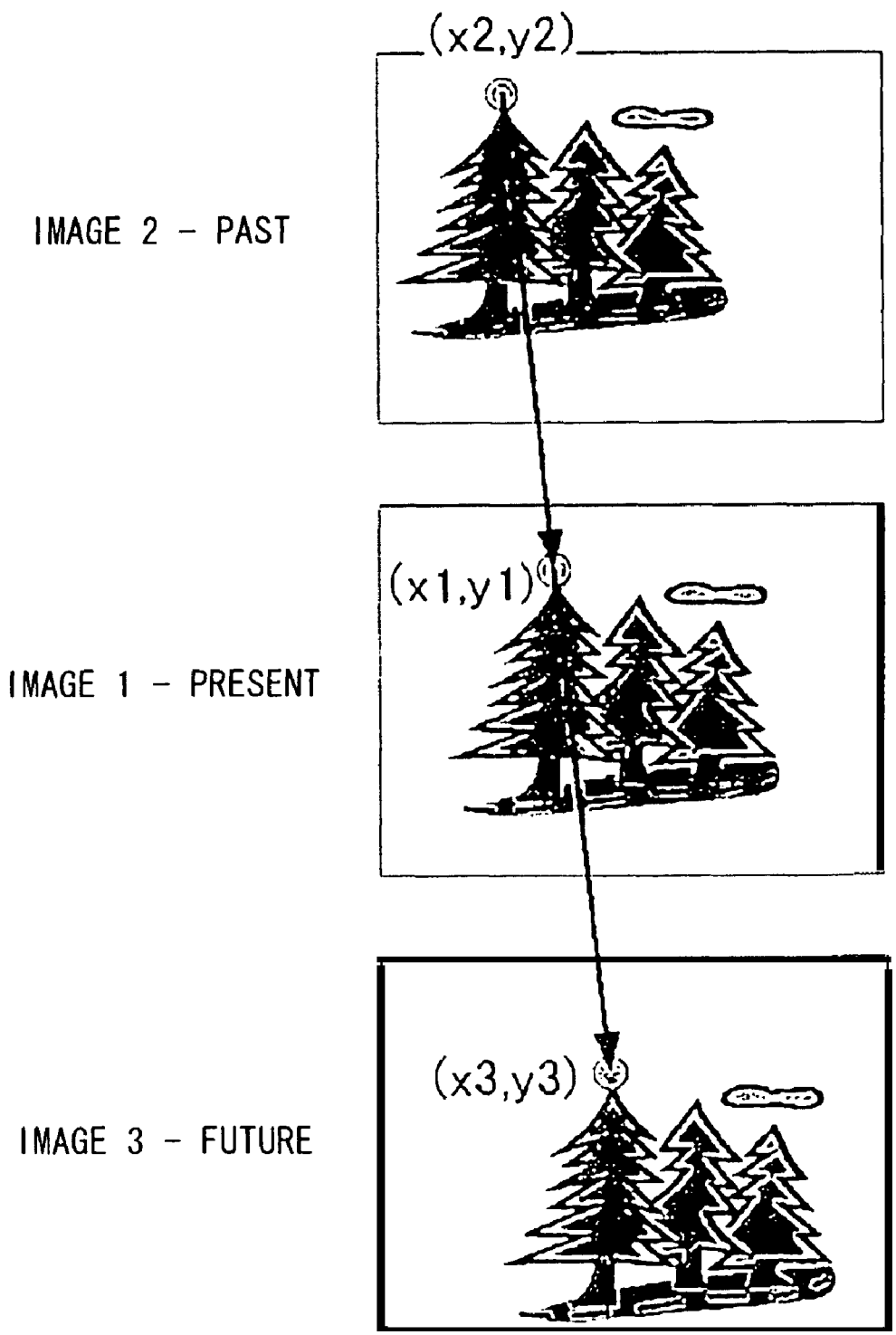
FIG. 14 is a diagram for describing a translation amount of an image.

Next, the pyramid hierarchical tier creation condition generating unit 32 estimates the amount of translation ($trans13_x$, $trans13_y$) between the image 1 and the image 3, from the amount of translation ($trans12_x$, $trans12_y$) between the image 1 and the image 2 (step S214). As illustrated in FIG. 14, in a group of temporally-successive images, the amount of movement occurring between the image 1 and the image 3 and the amount of movement occurring between the image 1 and the image 2 can be estimated to be substantially equal to each other. Therefore, a setting is made so that ($trans13_x$, $trans13_y$)=($trans12_x$, $trans12_y$).

Next, a hierarchical tier count (hereinafter, referred to as "necessary hierarchical tier count") py_num employed when creating pyramid hierarchical tiers from the image 3 is set based on the translation amount ($trans13_x$, $trans13_y$) between the image 1 and the image 3 estimated at step S214 (step S216).

As has already been described, pyramid hierarchical tiers are employed for responding to a large movement amount, which is a weak point in gradient methods. For example, where the movement amount of a certain feature point is 100 pixels in the zeroth hierarchical tier in pyramid hierarchical tiers, which have been created by stepwise horizontal and vertical ½ decimation, the he movement amount will be 50 pixels in the first hierarchical tier and 25 pixels in the second hierarchical tier, and thus, as the number of hierarchical tiers in the pyramid is increased, the appearing movement amount is decreased, enabling the weak point in gradient methods to be overcome.

However, an increase in hierarchical tier means that the number of feature point tracking target hierarchical tiers is increased by that amount, resulting in an increase in processing time.

Therefore, in the present embodiment, the amount of movement between the image 1 and the image 3 is estimated in advance, and the necessary hierarchical tier count py_num is set based on the estimate values ($trans13_1$, $trans13_y$) of the amount of movement between the image 1 and the image 3. More specifically, the pyramid hierarchical tier creation condition generating unit 32 sets the necessary hierarchical tier count py_num according to the translation amount values (for example, one with the larger absolute value of $trans13_x$ and $trans13_y$) as indicated in Table 3.

TABLE 3

Example of hierarchical tier count setting

| | Translation amount | | | |
|---|---|---|---|---|
| | Not less than 0 pixels and less than 10 pixels | Not less than 10 pixels and less than 20 pixels | Not less than 20 pixels and less than 40 pixels | Not less than 40 pixels and less than 80 pixels |
| Necessary hierarchical tier count py_num | 1 (Zeroth hierarchical tier alone) | 2 | 3 | 4 |

Next, the pyramid hierarchical tier creation condition generating unit 32 provides the necessary hierarchical tier count py_num obtained at step S216 to the pyramid hierarchical tier creating unit 20. The pyramid hierarchical tier creating unit 20 reads the image 3 from the image memory 14 (step S218), creates hierarchical tier images $py3_1, py3_2, \ldots py3_{py\_num-1}$ by stepwise image reduction of the image 3 to form a tracking pyramid py3 (step S220). Then, the pyramid hierarchical tier creating unit 20 writes the group of hierarchical tier images in the tracking pyramid py3 to the image memory 14 (step S222).

Next, in response to an instruction from the displacement calculation control unit 24, the displacement calculating unit 26 retrieves the coordinates (x1, y1) of a plurality of feature points stored in the feature point memory 16 (step S224). Then, feature point tracking is performed between the image 1 and the image 3 (step S226), and the coordinates (x2, y2) of the tracking points obtained as result of the feature point tracking are recorded in the feature point memory 16 (step S228). The feature point tracking process at step S226 is similar to the above-described feature point tracking process in FIG. 5.

According to the present embodiment, an amount of position movement occurring between images, which are current feature point tracking targets, is estimated from the results of past feature point tracking, and the number of hierarchical tiers for hierarchical tier images to be created from the image 3 is determined based on the amount of position movement, eliminating the need to create extra hierarchical tiers. Consequently, an image memory capacity can be saved while reducing the number of tracking target hierarchical tiers, enabling speed-up of feature point detection.

Fourth Embodiment

Next, a fourth embodiment of the present invention will be described. In the below description, a description of the components that are similar to those in the first embodiment will be omitted.

The present embodiment is adapted so that when feature point tracking is performed for three images, that is, an image 1, an image 2 that is temporally older than the image 1, and an image 3 that is temporally newer than the image 1 (for example, images successively taken at substantially-equal time intervals, such as, for example, continuous shots or motion picture frames, or images successively taken while the apparatus being panned or tilted at substantially-equal intervals), the first feature point tracking hierarchical tier when performing tracking point detection between the image 1 and the image 3 is set according to the distance between the feature point and a tracking point (the movement amount of the feature point) obtained by performing feature point tracking between the image 1 and the image 2.

Figure 15:
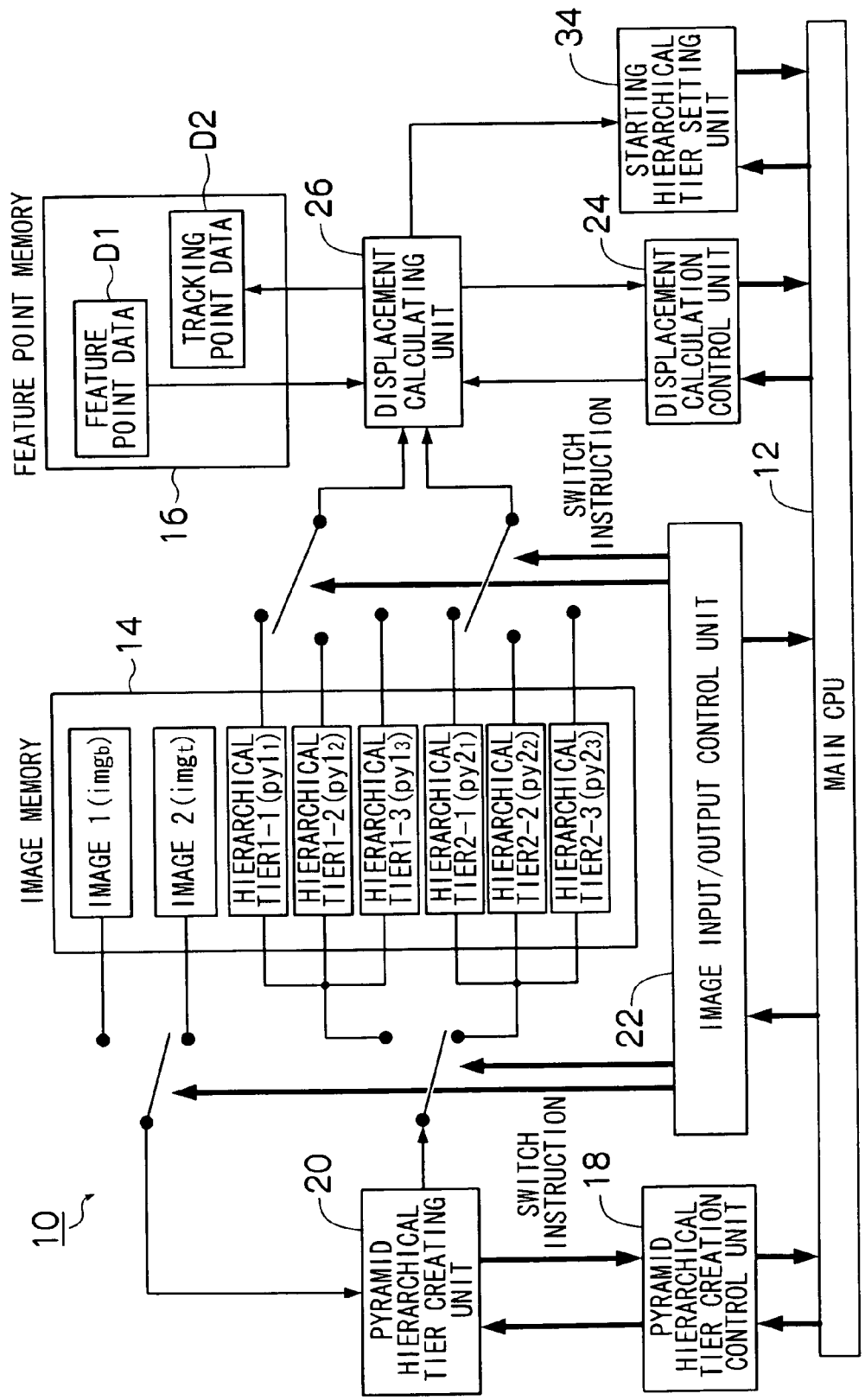
FIG. 15 is a block diagram illustrating an image processing apparatus according to a fourth embodiment of the present invention.

FIG. 15 is a block diagram illustrating an image processing apparatus according to the fourth embodiment of the present invention. As illustrated in FIG. 15, an image processing apparatus 10 according to the present embodiment includes a starting hierarchical tier setting unit 34.

Figure 16:
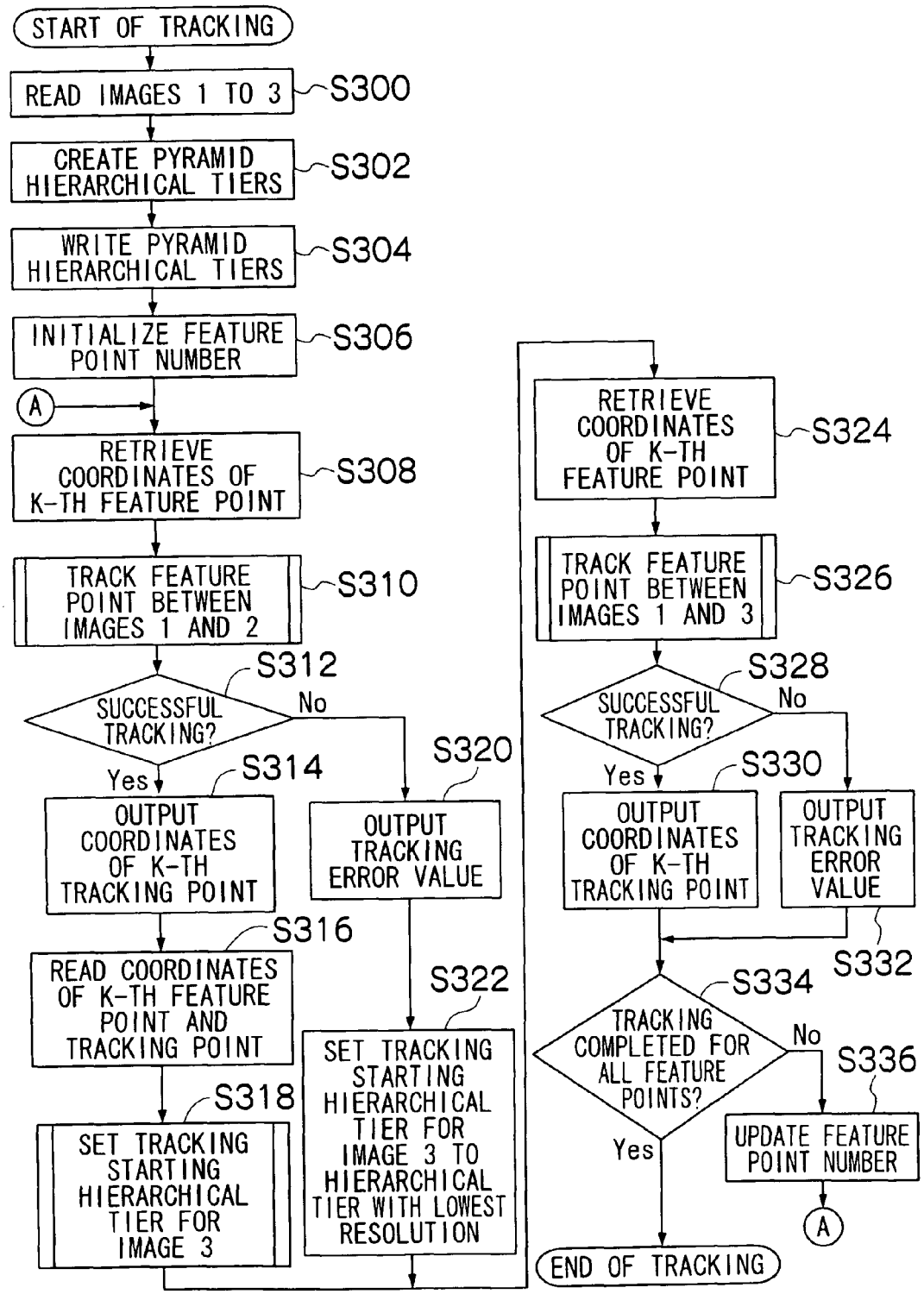
FIG. 16 is a flowchart illustrating an image processing method according to a fourth embodiment of the present invention.

Hereinafter, an image processing method according to the fourth embodiment of the present invention will be described with reference to the flowchart in FIG. 16.

First, in response to an instruction from a pyramid hierarchical tier creation control unit 18, a pyramid hierarchical tier creating unit 20 reads an image 1, an image 2 (an image temporally older than the image 1) and an image 3 (an image temporally newer than the image 1) from an image memory 14 (step S300). Then, the pyramid hierarchical tier creating unit 20 creates hierarchical tier images $py1_1, py1_2, \ldots py1_{py\_num-1}$ by means of stepwise image reduction of the image 1. Also, the pyramid hierarchical tier creating unit 20 creates hierarchical tier images $py2_1, py2_2, \ldots py2_{py\_num-1}$, and hierarchical tier images $py3_1, py3_2, \ldots py3_{py\_num-1}$ by means of stepwise image reduction of the image 2 and the image 3, respectively. Consequently, a reference pyramid py1, and tracking pyramids py2 and py3 are created (step S302). Next, the pyramid hierarchical tier creating unit 20 writes the hierarchical tier images in the reference pyramid py1 and the tracking pyramids py2 and py3 created at step S302 to the image memory 14 (step S304). Here, the number of hierarchical tiers for the pyramid hierarchical tier images is py_num.

Next, the feature point number k is initialized (i.e., k=0) (step S306). In response to an instruction from a displacement calculation control unit 24, a displacement calculating unit 26 retrieves the coordinates (x1, y1) of the k-th feature point from among the coordinates of a plurality of feature points stored in a feature point memory 16 (step S308). Here, the coordinate values of the feature points stored in the feature point memory 16 are the coordinate values in the zeroth hierarchical tier $py1_0$ (the image with the largest image size (reference image ($img_b$)) in the pyramid.

Next, feature point tracking is performed between the image 1 and the image 2 for the k-th feature point (step S310). The feature point tracking process at step S310 is similar to the above-described feature point tracking process in FIGS. 4 and 5. Then, if the feature point tracking have successfully been performed (Yes at step S312), the coordinates (x2, y2) of the tracking point in the image 2 obtained as a result of the feature point tracking is recorded in the feature point memory 16 (step S314).

Next, the starting hierarchical tier setting unit 34 reads the coordinate values (x1, y1) of the k-th feature point and the coordinate values (x2, y2) of the corresponding tracking point that have been recorded in the feature point memory 16 at the immediately previous step, step S314 (step S316). Then, the amount of displacement ($disp13_x$, $disp13_y$) of the feature point, which can be expected to occur between the image 1 and the image 3, is estimated based on the amount of displacement ($disp12_x$, $disp12_y$) of the feature point arising from the amount of position movement occurring between the image 1 and the image 2. The displacement amount ($disp12_x$, $disp12_y$) can be calculated in such a manner as is substantially similar to that for the translation amount ($trans12_x$, $trans12_y$). As illustrated in FIG. 14, if the images 1 to 3 are a group of temporally-successive images, the amount of feature point displacement arising from the amount of movement occurring between the image 1 and the image 3 and the amount of feature point displacement arising from the amount of movement occurring between the image 1 and the image 2 can be estimated to be substantially equal to each other. Therefore, in the present embodiment, a setting is made so that ($disp13_x$, $disp13_y$)=($disp12_x$, $disp12_y$).

Next, the starting hierarchical tier setting unit 34 determines from which hierarchical tier to start feature point tracking between the image 1 and the image 3, that is, sets the starting tier number $n_{start}$ based on the estimated feature point displacement amount ($disp13_x$, $disp13_y$) (step S318). In the present embodiment, the amount of feature point displacement occurring between the image 1 and the image 3 is estimated in advance, and the hierarchical tier to start feature point tracking is set based on the estimated value, suppressing the number of feature point trackings. More specifically, the starting hierarchical tier setting unit 34 determines the starting tier number $n_{start}$ according to the feature point displacement amount values (for example, one with the larger absolute value of $disp13_x$ and $disp13_y$) as indicated in Table 4.

TABLE 4

Example of starting hierarchical tier number setting

| | Feature point displacement amount | | | |
|---|---|---|---|---|
| | Not less than 0 pixels and less than 10 pixels | Not less than 10 pixels and less than 20 pixels | Not less than 20 pixels and less than 40 pixels | Not less than 40 pixels and less than 80 pixels |
| Starting hierarchical tier $n_{start}$ | Zeroth hierarchical tier | First hierarchical tier | Second hierarchical tier | Third hierarchical tier |

Meanwhile, when the feature point tracking at step S310 have been failed (No at step S312), a tracking error value is recorded in the feature point memory 16 (step S320). Then, the starting hierarchical tier setting unit 34 sets the starting hierarchical tier (tier number $n_{start}$) for performing feature point tracking between the image 1 and the image 3 to the lowest-resolution hierarchical tier (tier number (py_num−1)).

Upon the starting hierarchical tier being set through steps S312 to S322, the coordinates (x1, y1) of the k-th feature point are retrieved (step S324), and tracking of the k-th feature point is performed between the image 1 and the image 3 (step S326). Then, if the feature point tracking have successfully been performed (Yes at step S328), the coordinates (x3, y3) of the tracking point in the image 3 obtained as a result of the feature point tracking are recorded in the feature point memory 16 (step S330). Meanwhile, if the feature point tracking step S310 have been failed (No at step S328), an tracking error value is recorded in the feature point memory 16 (step S332).

Next, the feature point number is updated (incremented) (No at step S334, and step S336), and the process returns to step S308. Then, upon completion of feature point tracking for all the feature points in the feature point memory 16 (step S334), all the processes for feature point tracking are completed.

In the present embodiment, the amount of displacement of a feature point, which can be expected to occur between images, which are next feature point tracking targets, is estimated from the results of the past feature point tracking, and the hierarchical tier to start tracking is automatically determined based on the displacement amount. Consequently, the number of tracking target hierarchical tiers is reduced, enabling speed-up of tracking point detection.

The image processing apparatus 10 according to each of the above-described embodiments can be provided as, for example, an image pickup device for taking images, a device having a function that analyzes and processes images or an application program to be employed in these devices.

What is claimed is:

1. An image processing apparatus, comprising:
an image obtaining device that obtains a first image and a second image;
a hierarchical tier image creating device that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing;
a tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and
a sequential detection device that performs the tracking point detection by the tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image,
wherein the tracking point detecting device includes:
a displacement calculating device that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image;
a detection result outputting device that stops the repetitive tracking point detection by the displacement calculating device when the displacement amount converges on a value of less than a first threshold value or the repetition count of the tracking point position detection reaches not less than a second threshold value, and outputs a value of each of the displacement amount and the repetition count for the point of time of stopping the repetitive detection; and
a criterion setting device that sets the first threshold value for the case where the tracking point detection by the tracking point detecting device is performed for the first and second hierarchical tier images in the first and second hierarchical tier image groups, respectively, the first and second hierarchical tier images having a second resolution that is higher than the first resolution, according to the value of each of the displacement amount and the repetition count output from the detection result outputting device.

2. The image processing apparatus according to claim 1, wherein when the value of the displacement amount output from the detection result outputting device is smaller than a third threshold value, the criterion setting device sets the first threshold value to be smaller than the first threshold value for the case where the displacement amount is not less than the third threshold value.

3. The image processing apparatus according to claim 1, wherein when the value of the repetition count output from the detection result outputting device is smaller than a fourth threshold value the criterion setting device sets the first threshold value to be smaller than the first threshold value for the case where the repetition count is not less than the fourth threshold value.

4. The image processing apparatus according to claim 1, further comprising: a hierarchical tier selecting device that selects a hierarchical tier that is a next target for performing the tracking point detection by the tracking point detecting device according to the value of each of the displacement amount and the repetition count output from the detection result outputting device.

5. An image processing apparatus, comprising:
an image obtaining device that obtains a first image and a second image;
a hierarchical tier image creating device that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing;
a tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and
a sequential detection device that performs the tracking point detection by the tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image,
wherein the tracking point detecting device includes:
a displacement calculating device that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image; and
a detection result outputting device that stops the repetitive tracking point detection by the displacement calculating device when the displacement amount converges on a value of less than a first threshold value or the repetition count of the tracking point position detection reaches not less than a second threshold value, and outputs a value of each of the displacement amount and the repetition count for the point of time of stopping the repetitive detection, and wherein the image processing apparatus further comprises a hierarchical tier selecting device that selects a hierarchical tier that is a next target for performing the tracking point detection by the tracking point detecting device according to the value of each of the displacement amount and the repetition count output from the detection result outputting device.

6. The image processing apparatus according to claim 5, wherein when the value of the displacement amount output from the detection result outputting device is smaller than a fifth threshold value, the hierarchical tier selecting device sets the hierarchical tier that is a next target for performing the tracking point detection by the tracking point detecting device to a hierarchical tier that is two or more levels higher than the current target hierarchical tier.

7. The image processing apparatus according to claim 5, wherein when the value of the repetition count output from the detection result outputting device is smaller than a sixth threshold value, the hierarchical tier selecting device sets the hierarchical tier that is a next target for performing the tracking point detection by the tracking point detecting device to a hierarchical tier that is two or more levels higher than the current target hierarchical tier.

8. An image processing apparatus, comprising:
  an image obtaining device that obtains a first image, a second image and a third image, the second image and the third image being taken temporally before and after the first image being taken;
  a first hierarchical tier image creating device that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing;
  a first tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and
  a first sequential detection device that performs the tracking point detection by the first tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image;
  a movement amount calculating device that calculates an amount of movement between the first image and the second image based on the positions of the feature point and the tracking point in the first and second images, and estimates an amount of movement between the first image and the third image;
  a hierarchical tier count setting device that sets a hierarchical tier count for hierarchical tier images created from the third image, based on the amount of movement between the first image and the third image;
  a second hierarchical tier image creating device that creates a number of third hierarchical tier images with different resolutions by subjecting the third image to stepwise reduction processing, the number corresponding to the hierarchical tier count set by the hierarchical tier count setting device, to create a third hierarchical tier image group;
  a second tracking point detecting device that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and
  a second sequential detection device that performs the tracking point detection by the second tracking point detecting device for hierarchical tier images included in each of the first and third hierarchical tier image groups in increasing order of resolution while reflecting the result of tracking point detection in a hierarchical tier image with a lower resolution, to detect a position of a tracking point in the third image, the tracking point corresponding to a feature point in the first image.

9. The image processing apparatus according to claim 8, wherein the hierarchical tier count setting device sets the hierarchical tier count so as to become larger as the amount of movement is larger.

10. The image processing apparatus according to claim 8, wherein the movement amount calculating device creates a motion vector representing a displacement direction and displacement amount of the feature point based on each of the positions of the feature points and the tracking points for the first and second images, and calculates an average value or median value of the motion vectors as the amount of movement.

11. The image processing apparatus according to claim 8, wherein the movement amount calculating device estimates that the amount of movement between the first image and the second image and the amount of movement between the first image and the third image are equal to each other.

12. An image processing apparatus, comprising:
  an image obtaining device that obtains a first image, a second image and a third image, the second image and the third image being taken temporally before and after the first image being taken;
  a hierarchical tier image creating device that creates a first hierarchical tier image group including a plurality of first hierarchical tier images with different resolutions by subjecting the first image to stepwise reduction processing, creates a second hierarchical tier image group including a plurality of second hierarchical tier images with different resolutions by subjecting the second image to stepwise reduction processing, and creates a third hierarchical tier image group including a plurality of third hierarchical tier images with different resolutions by subjecting the third image to stepwise reduction processing;
  a first tracking point detecting device that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images;

a first sequential detection device that performs the tracking point detection by the first tracking point detecting device for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image;

a movement amount calculating device that calculates an amount of movement between the first image and the second image based on the positions of the feature point and the tracking point in the first and second images, and estimates an amount of movement between the first image and the third image;

a starting hierarchical tier setting device that sets a starting hierarchical tier to start feature point detection for the first image and the third image, based on the amount of movement between the first image and the third image;

a second tracking point detecting device that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection device that performs the tracking point detection by the second tracking point detecting device starting from a hierarchical tier image in the starting hierarchical tier in increasing order of resolution while reflecting the result of tracking point detection in a hierarchical tier image with a lower resolution, to detect a position of a tracking point in the third image, the tracking point corresponding to a feature point in the first image.

13. The image processing apparatus according to claim 12, wherein the starting hierarchical tier setting device sets a hierarchical tier including a hierarchical tier image with a lower resolution to the starting hierarchical tier as the amount of movement is larger.

14. The image processing apparatus according to claim 12, wherein the movement amount calculating device estimates that the amount of movement between the first image and the second image and the amount of movement between the first image and the third image are equal to each other.

15. An image processing method, comprising the steps of:
an image obtaining step of obtaining a first image and a second image;

a hierarchical tier image creating step of creating a first hierarchical tier image group including a plurality of first hierarchical tier images with different resolutions by subjecting the first image to stepwise reduction processing, and creating a second hierarchical tier image group including a plurality of second hierarchical tier images with different resolutions by subjecting the second image to stepwise reduction processing;

a tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and a sequential detection step of performing the tracking point detection in the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting step includes:

a displacement calculating step of repeatedly detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculating a displacement amount representing a distance between a latest tracking point detected as a result of a detection repetition and a tracking point obtained as a result of a detection repetition before the detection repetition in the second image;

a detection result outputting step of stopping the repetitive tracking point detection in the displacement calculating step when the displacement amount converges on a value of less than a first threshold value or the repetition count of the tracking point position detection reaches not less than a second threshold value, and outputting a value of each of the displacement amount and the repetition count for the point of time of stopping the repetitive detection; and a criterion setting step of setting the first threshold value for the case where the tracking point detection in the tracking point detecting step is performed for first and second hierarchical tier images in the first and second hierarchical tier image groups, respectively, the first and second hierarchical tier images having a second resolution that is higher than the first resolution, according to the value of each of the displacement amount and the repetition count output in the detection result outputting step.

16. The image processing method according to claim 15, wherein the criterion setting step includes, when the value of the displacement amount output in the detection result outputting step is smaller than a third threshold value, setting the first threshold value to be smaller than the first threshold value for the case where the displacement amount is not less than the third threshold value.

17. The image processing method according to claim 15, wherein the criterion setting step includes, when the value of the repetition count output in the detection result outputting step is smaller than a fourth threshold value, setting the first threshold value to be smaller than the first threshold value for the case where the repetition count is not less than the fourth threshold value.

18. The image processing method according to claim 15, further comprising: a hierarchical tier selecting step of selecting a hierarchical tier that is a next target for performing the tracking point detection in the tracking point detecting step according to the value of each of the displacement amount and the repetition count output in the detection result outputting step.

19. An image processing method, comprising the steps of:
an image obtaining step of obtaining a first image and a second image;
a hierarchical tier image creating step of creating a first hierarchical tier image group including a plurality of first hierarchical tier images with different resolutions by subjecting the first image to stepwise reduction processing, and creating a second hierarchical tier image group including a plurality of second hierarchical tier images with different resolutions by subjecting the second image to stepwise reduction processing;
a tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and
a sequential detection step of performing the tracking point detection in the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image,
wherein the tracking point detecting step includes:
a displacement calculating step of repeatedly detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculating a displacement amount representing a distance between a latest tracking point detected as a result of a detection repetition and a tracking point obtained as a result of a detection repetition before the detection repetition in the second image; and
a detection result outputting step of stopping the repetitive tracking point detection in the displacement calculating step when the displacement amount converges on a value of less than a first threshold value or the repetition count of the tracking point position detection reaches not less than a second threshold value, and outputting a value of each of the displacement amount and the repetition count for the point of time of stopping the repetitive detection, and
wherein the image processing method further comprises a hierarchical tier selecting step of selecting a hierarchical tier that is a next target for performing the tracking point detection in the tracking point detecting step according to the value of each of the displacement amount and the repetition count output in the detection result outputting step.

20. The image processing method according to claim 19, wherein the hierarchical tier selecting step includes, when the value of the displacement amount output in the detection result outputting step is smaller than a fifth threshold value, setting the hierarchical tier that is a next target for performing the tracking point detection in the tracking point detecting step to a hierarchical tier that is two or more levels higher than the current target hierarchical tier.

21. The image processing method according to claim 19, wherein the hierarchical tier selecting step includes, when the value of the repetition count output in the detection result outputting step is smaller than a sixth threshold value, setting the hierarchical tier that is a next target for performing the tracking point detection in the tracking point detecting step to a hierarchical tier that is two or more levels higher than the current target hierarchical tier.

22. An image processing method, comprising the steps of:
an image obtaining step of obtaining a first image, a second image and a third image, the second image and the third image being taken temporally before and after the first image being taken;
a first hierarchical tier image creating step of creating a first hierarchical tier image group including a plurality of first hierarchical tier images with different resolutions by subjecting the first image to stepwise reduction processing, and creating a second hierarchical tier image group including a plurality of second hierarchical tier images with different resolutions by subjecting the second image to stepwise reduction processing;
a first tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images;
a first sequential detection step of performing the tracking point detection in the first tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image;
a movement amount calculating step of calculating an amount of movement between the first image and the second image based on the positions of the feature point and the tracking point in the first and second images, and estimating an amount of movement between the first image and the third image;
a hierarchical tier count setting step of setting a hierarchical tier count for hierarchical tier images created from the third image, based on the amount of movement between the first image and the third image;
a second hierarchical tier image creating step of creating a number of third hierarchical tier images with different resolutions by subjecting the third image to stepwise reduction processing, the number corresponding to the hierarchical tier count set by the hierarchical tier count setting step, to create a third hierarchical tier image group;
a second tracking point detecting step of detecting a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step of performing the tracking point detection in the second tracking point detecting step for hierarchical tier images included in each of the first and third hierarchical tier image groups in increasing order of resolution while reflecting the result of tracking point detection in a hierarchical tier image with a lower resolution, to detect a position of a tracking point in the third image, the tracking point corresponding to a feature point in the first image.

23. The image processing method according to claim 22, wherein the hierarchical tier count setting step includes setting the hierarchical tier count so as to become larger as the amount of movement is larger.

24. An image processing method, comprising the steps of:
an image obtaining step of obtaining a first image, a second image and a third image, the second image and the third image being taken temporally before and after the first image being taken;
a hierarchical tier image creating step of creating a first hierarchical tier image group including a plurality of first hierarchical tier images with different resolutions by subjecting the first image to stepwise reduction processing, creating a second hierarchical tier image group including a plurality of second hierarchical tier images with different resolutions by subjecting the second image to stepwise reduction processing, and creating a third hierarchical tier image group including a plurality of third hierarchical tier images with different resolutions by subjecting the third image to stepwise reduction processing;
a first tracking point detecting step of detecting a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images;
a first sequential detection step of performing the tracking point detection in the first tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image;
a movement amount calculating step of calculating an amount of movement between the first image and the second image based on the positions of the feature point and the tracking point in the first and second images, and estimating an amount of movement between the first image and the third image;
a starting hierarchical tier setting step of setting a starting hierarchical tier to start feature point detection for the first image and the third image, based on the amount of movement between the first image and the third image;
a second tracking point detecting step of detecting a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step of performing the tracking point detection in the second tracking point detecting step starting from a hierarchical tier image in the starting hierarchical tier in increasing order of resolution while reflecting the result of tracking point detection in a hierarchical tier image with a lower resolution, to detect a position of a tracking point in the third image, the tracking point corresponding to a feature point in the first image.

25. The image processing method according to claim 24, wherein the starting hierarchical tier setting step including setting a hierarchical tier including a hierarchical tier image with a lower resolution to the starting hierarchical tier as the amount of movement is larger.

26. A non-transitory computer-readable medium tangibly embodying a program of computer-readable instructions executable by a digital processing apparatus to perform an image processing method, said method comprising:
an image obtaining step that obtains a first image and a second image;
a hierarchical tier image creating step that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing;
a tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and
a sequential detection step that performs the tracking point detection by the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image,
wherein the tracking point detecting step includes:
a displacement calculating step that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image;
a detection result outputting step that stops the repetitive tracking point detection by the displacement calculating function when the displacement amount converges on a value of less than a first threshold value or the repetition count of the tracking point position detection reaches not less than a second threshold value, and outputs a value of each of the displacement amount and the repetition count for the point of time of stopping the repetitive detection; and a criterion setting step that sets the first threshold value for the case where the tracking point detection by the tracking point detecting step is performed for first and second hierarchical tier images in the first and second hierarchical tier image groups, respectively, the first and second hierarchical tier images having a second resolution that is higher than the first resolution, according to the value of each of the displacement amount and the repetition count by the detection result outputting function.

27. The non-transitory computer-readable medium according to claim 26, wherein when the value of the displacement amount output by the detection result outputting function is smaller than a third threshold value, the criterion setting function sets the first threshold value to be smaller than the first threshold value for the case where the displacement amount is not less than the third threshold value.

28. The non-transitory computer-readable medium according to claim 26, wherein when the value of the repetition count output by the detection result outputting function is smaller than a fourth threshold value the criterion setting function sets the first threshold value to be smaller than the first threshold value for the case where the repetition count is not less than the fourth threshold value.

29. The non-transitory computer-readable medium according to claim 26, further comprising: a hierarchical tier selecting step that selects a hierarchical tier that is a next target for performing the tracking point detection by the tracking point detecting step according to the value of each of the displacement amount and the repetition count output by the detection result outputting step.

30. A non-transitory computer-readable medium tangibly embodying a program of computer-readable instructions executable by a digital processing apparatus to perform an image processing method, said method comprising:

an image obtaining step that obtains a first image and a second image;

a hierarchical tier image creating step that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing;

a tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images; and a sequential detection step that performs the tracking point detection by the tracking point detecting step for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image, wherein the tracking point detecting step includes:

a displacement calculating step that repeatedly detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images, and calculates a displacement amount representing a distance between a latest tracking point detected as a result of a detection repetition and a tracking point obtained as a result of a detection repetition before the detection repetition in the second image; and a detection result outputting step that stops the repetitive tracking point detection by the displacement calculating function when the displacement amount converges on a value of less than a first threshold value or the repetition count of the tracking point position detection reaches not less than a second threshold value, and outputs a value of each of the displacement amount and the repetition count for the point of time of stopping the repetitive detection, and wherein the image processing method further comprises: a hierarchical tier selecting step that selects a hierarchical tier that is a next target for performing the tracking point detection by the tracking point detecting step according to the value of each of the displacement amount and the repetition count output by the detection result outputting step.

31. The non-transitory computer-readable medium according to claim 30, wherein when the value of the displacement amount output by the detection result outputting function is smaller than a fifth threshold value, the hierarchical tier selecting function sets the hierarchical tier that is a next target for performing the tracking point detection by the tracking point detecting function to a hierarchical tier that is two or more levels higher than the current target hierarchical tier.

32. The non-transitory computer-readable medium according to claim 30, wherein when the value of the repetition count output by the detection result outputting function is smaller than a sixth threshold value, the hierarchical tier selecting function sets the hierarchical tier that is a next target for performing the tracking point detection by the tracking point detecting function to a hierarchical tier that is two or more levels higher than the current target hierarchical tier.

33. A non-transitory computer-readable medium tangibly embodying a program of computer-readable instructions executable by a digital processing apparatus to perform an image processing method, said method comprising:

an image obtaining step that obtains a first image, a second image and a third image, the second image and the third image being taken temporally before and after the first image being taken;

a first hierarchical tier image creating step that creates a first hierarchical tier image group including a plurality of first hierarchical tier images with different resolutions by subjecting the first image to stepwise reduction processing, and creates a second hierarchical tier image group including a plurality of second hierarchical tier images with different resolutions by subjecting the second image to stepwise reduction processing;

a first tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images;

a first sequential detection step that performs the tracking point detection by the first tracking point detecting function for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image;

a movement amount calculating step that calculates an amount of movement between the first image and the second image based on the positions of the feature point and the tracking point in the first and second images, and estimates an amount of movement between the first image and the third image;

a hierarchical tier count setting step that sets a hierarchical tier count for hierarchical tier images created from the third image, based on the amount of movement between the first image and the third image;

a second hierarchical tier image creating step that creates a number of third hierarchical tier images with different resolutions by subjecting the third image to stepwise reduction processing, the number corresponding to the hierarchical tier count set by the hierarchical tier count setting function, to create a third hierarchical tier image group;

a second tracking point detecting step that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step that performs the tracking point detection by the second tracking point detecting function for hierarchical tier images included in each of the first and third hierarchical tier image groups in increasing order of resolution while reflecting the result of tracking point detection in a hierarchical tier image with a lower resolution, to detect a position of a tracking point in the third image, the tracking point corresponding to a feature point in the first image.

34. The non-transitory computer-readable medium according to claim 33, wherein the hierarchical tier count setting function sets the hierarchical tier count so as to become larger as the amount of movement is larger.

35. A non-transitory computer-readable medium tangibly embodying a program of machine-readable instructions executable by a digital processing apparatus to perform an image processing method, said method comprising:

an image obtaining step that obtains a first image, a second image and a third image, the second image and the third image being taken temporally before and after the first image being taken;

a hierarchical tier image creating step that creates a first hierarchical tier image group including a plurality of first hierarchical tier images with different resolutions by subjecting the first image to stepwise reduction processing, creates a second hierarchical tier image group including a plurality of second hierarchical tier images with different resolutions by subjecting the second image to stepwise reduction processing, and creates a third hierarchical tier image group including a plurality of third hierarchical tier images with different resolutions by subjecting the third image to stepwise reduction processing;

a first tracking point detecting step that detects a position of a tracking point in a second hierarchical tier image with a predetermined resolution in the second hierarchical tier image group, the tracking point corresponding to a predetermined feature point in a first hierarchical tier image with the predetermined resolution in the first hierarchical tier image group, based on a gradient of an image signal in each of the first and second hierarchical tier images;

a first sequential detection step that performs the tracking point detection by the first tracking point detecting function for hierarchical tier images included in each of the first and second hierarchical tier image groups in increasing order of resolution while reflecting the result of tracking point detection in a hierarchical tier image with a lower resolution, to detect a position of a tracking point in the second image, the tracking point corresponding to a feature point in the first image;

a movement amount calculating step that calculates an amount of movement between the first image and the second image based on the positions of the feature point and the tracking point in the first and second images, and estimates an amount of movement between the first image and the third image;

a starting hierarchical tier setting step that sets a starting hierarchical tier to start feature point detection for the first image and the third image, based on the amount of movement between the first image and the third image;

a second tracking point detecting step that detects a position of a tracking point in a third hierarchical tier image with a predetermined resolution in the third hierarchical tier image group, the tracking point corresponding to a predetermined feature point in a first hierarchical tier image with the predetermined resolution in the first hierarchical tier image group, based on a gradient of an image signal in each of the first and third hierarchical tier images; and a second sequential detection step that performs the tracking point detection by the second tracking point detecting function starting from a hierarchical tier image in the starting hierarchical tier in increasing order of resolution while reflecting the result of tracking point detection in a hierarchical tier image with a lower resolution, to detect a position of a tracking point in the third image, the tracking point corresponding to a feature point in the first image.

36. The non-transitory computer-readable medium according to claim 35, wherein the starting hierarchical tier setting step sets a hierarchical tier including a hierarchical tier image with a lower resolution to the starting hierarchical tier as the amount of movement is larger.

* * * * *